(12) United States Patent
Wise et al.

(10) Patent No.: US 10,225,216 B2
(45) Date of Patent: Mar. 5, 2019

(54) CONVERSATION INTERFACE AGENT FOR MANUFACTURING OPERATION INFORMATION

(71) Applicant: Rockwell Automation Technologies, Inc., Mayfield Heights, OH (US)

(72) Inventors: Jonathan Wise, Chardon, OH (US); Petr Ptacek, Auburn Township, OH (US); David Wayne Comeau, Auburn Township, OH (US); Nancy Lynne Burnham, Chagrin Falls, OH (US); Jonathan D. Walter, Broadview Heights, OH (US); Michael John Pantaleano, Willoughby, OH (US); Eugene Liberman, Rocky River, OH (US); Kenneth S. Plache, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 124 days.

(21) Appl. No.: 15/164,729

(22) Filed: May 25, 2016

(65) Prior Publication Data

US 2017/0346768 A1    Nov. 30, 2017

(51) Int. Cl.
*G10L 15/18* (2013.01)
*G10L 15/22* (2006.01)
(Continued)

(52) U.S. Cl.
CPC ...... *H04L 51/046* (2013.01); *G06F 17/30401* (2013.01); *H04L 43/06* (2013.01); *H04L 51/066* (2013.01); *H04L 67/306* (2013.01)

(58) Field of Classification Search
CPC ... H04L 51/02; G06F 17/28; G06F 17/30976; G06F 17/30654
(Continued)

(56) References Cited

U.S. PATENT DOCUMENTS

| 2010/0022231 A1* | 1/2010 | Heins ............... H04M 3/4872 455/418 |
| 2013/0138250 A1* | 5/2013 | Mowery et al. ... G05D 23/1917 700/276 |

(Continued)

*Primary Examiner* — Asad M Nawaz
*Assistant Examiner* — Jason A Harley
(74) *Attorney, Agent, or Firm* — Amin, Turocy & Watson, LLP

(57) ABSTRACT

A conversation interface system provides remote access to manufacturing operation information using plain language message exchange. A cloud-based conversation interface service is exposed to an instant messaging application, and receives plain language queries from via the instant messaging application's interface requesting information relating to one or more industrial systems. The cloud-based system synchronizes the queries to one or more on-premise conversation interface agent devices residing at one or more plant facilities. The on-premise agent devices translate the queries and apply the translated queries to local sources of manufacturing operation data. The on-premise agent devices then generate and return response messages based on the retrieved information, and the cloud-based system directs the response messages the originators of the queries via the instant messaging interface.

20 Claims, 18 Drawing Sheets

(51) Int. Cl.
*H04L 12/24* (2006.01)
*H04L 12/58* (2006.01)
*H04L 12/26* (2006.01)
*H04L 29/08* (2006.01)
*G06F 17/30* (2006.01)

(58) Field of Classification Search
USPC .................................................. 379/88.01
See application file for complete search history.

(56) References Cited

U.S. PATENT DOCUMENTS

2016/0154864 A1* 6/2016 Mangan, III ...... G06F 17/30554
  707/722
2017/0310613 A1* 10/2017 Lalji ...................... H04L 51/02

* cited by examiner

Today's News

⇄ Your Network Can Perform Faster!

A Duplex mismatch on your network is impacting network performance. For optimal communication speed, all devices should be configured to use the same duplex and speed configuration. Shelby has detected 12 devices configured for half-duplex and 36 devices configured for full-duplex.

Ask Shelby: | What are the devices? | How long has this been going on?

⟲ 32 Minutes Faulted Today

Of the 48 devices Shelby is monitoring, a total of 32 minutes of faulted time has been recorded so far today Ask Shelby: | Which devices are faulted the most?

◯ Worst Performing Device

Line 1 Conveyor PowerFlex 525 has faulted 22 times today, for a total of 8 minutes of downtime

Ask Shelby

Which devices are faulted the most?

Here's what I've found...

12 devices are in major level fault:
Line 1 Controller          Line 8 Drive
Packing Area Drive 2       Packing Area Drive 6
Line 4 Controller          Line 7 Controller
Bottling Area 3            Bottling Area 9
Bottling Area 2            Bottling Area 8
1756-L1 (bottling)         1756-L1 (packing)

20 devices are in major level fault:
Line 12 Controller         Line 4 Drive Ask Shelby

FIG. 12

CONVERSATION INTERFACE AGENT FOR MANUFACTURING OPERATION INFORMATION

BACKGROUND

The subject matter disclosed herein relates generally to industrial automation systems, and, for example, to data access and retrieval in an industrial environment.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for remotely interacting with manufacturing operation information is provided, comprising a query monitoring component configured to detect receipt of a plain language query message from a cloud-based conversation interface system, wherein the plain language query message originates from an instant message application that interfaces with the cloud-based conversation interface system; a translation component configured to determine, based on an analysis of the plain language query message, one or more items of manufacturing operation information being requested by the plain language query message; a query component configured to query one or more sources of industrial device data for the one or more items of manufacturing operation information; and a reply publishing component configured to formulate a plain language reply message based on the one or more items of manufacturing operation information and to send the plain language reply message to the cloud-based conversation interface system.

Also, one or more embodiments provide a method for remotely accessing status and operational information for an industrial system, comprising detecting, by a system comprising at least one processor, receipt of a plain language query message from a cloud-based conversation interface system, wherein the plain language query message is routed by the cloud-based conversation interface system from an instant message application; determining, by the system based on an analysis of the plain language query message, at least one of a status of an industrial system or an operational statistic of the industrial system being requested by the plain language query message; retrieving, by the system based on the determining, at least one of the status or the operational statistic from one or more sources of industrial data; generating, by the system, a plain language reply message based on the at least one of the status or the operational statistic retrieved from the one or more sources of industrial data; sending, by the system, the plain language reply message to the cloud-based conversation interface system.

Also, according to one or more embodiments, a non-transitory computer-readable medium is provided having stored thereon instructions that, in response to execution, cause a system to perform operations, the operations comprising determining that a plain language query message has been received from a cloud-based conversation interface system, wherein the plain language query message is routed by the cloud-based conversation interface system from an instant message application; analyzing the plain language query message to determine at least one of a status of an industrial system or an operational statistic of the industrial system being requested by the plain language query message; retrieving, based on the determining, at least one of the status or the operational statistic from one or more sources of industrial data associated with the industrial system; generating a plain language reply message based on the at least one of the status or the operational statistic retrieved from the one or more sources of industrial data; and sending the plain language reply message to the cloud-based conversation interface system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 12 is an example report page that allows a user to select and submit pre-formulated query messages to the conversation interface system.

DETAILED DESCRIPTION

Figure 1:
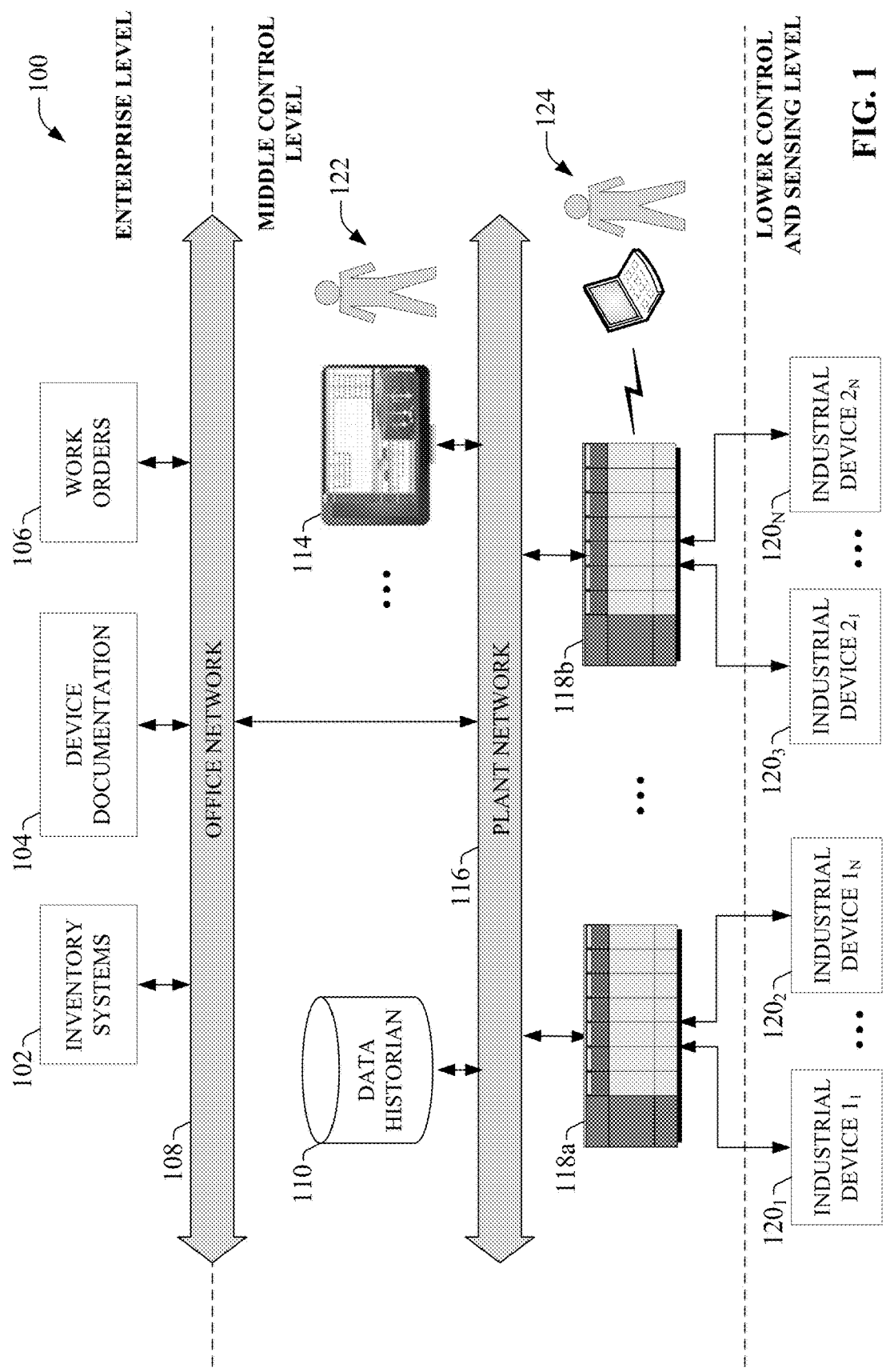
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, or a device documentation store 104 containing electronic documentation for the various industrial devices making up the controlled industrial systems. Other systems may include an inventory tracking system 102, a work order management system 106, repositories for machine or process drawings and documentation, vendor product documentation storage, vendor knowledgebases, internal knowledgebases, work scheduling applications, or other such systems, some or all of which may reside on an office network 108 of the industrial environment.

These diverse information sources are spread across many locations and systems within the plant environment. When diagnosing problems or determining the status of a machine or automation system, maintenance personnel are typically required to search several of these sources of information individually, often using several different software packages specific to the respective data sources being searched. Moreover, searching for information pertaining to a particular device or machine often requires an extensive knowledge of the overall industrial system in order to locate the data source to be searched (e.g., industrial controllers, HMIs, etc.), as well as to identify the relevant operator screens or control program routines. Individually searching each of these data sources in connection with solving a system downtime issue or ascertaining the health of an automation system or device can delay correction of maintenance issues, resulting in lost revenue and scheduling problems. Locating and acquiring relevant system data is also rendered more difficult by the non-intuitive nature of the applications used to present the data to the user (e.g., HMI displays, industrial controller program development and monitoring software, etc.). These applications may not be easily understood by users who have not been trained to navigate applications' features.

Also, users wishing to view information about a particular automation system typically must be located proximate to the automation system in order to access the local data sources associated with that system. For example, the control programming (e.g., ladder logic, sequential function chart, etc.) for controlling operation of a particular tank used in a batch process may execute on one of the industrial controllers 118, while the operator interface screens for viewing a graphical representation of the tank's current status and relevant setpoints (e.g., level setpoints, maximum flow setpoints, etc.) may be viewed on one of the HMIs 114.

Operators may view the operator interface screens for the tank of interest on the relevant HMI terminal (see operator 122), or may connect a personal computing device (e.g., a laptop computer) to the industrial controller to view the control programming used to control the tank's operation (see operator 124). In most cases, the operator must be in physical proximity to either the HMI terminal or the industrial controller in order to view the information for the associated automation system. This can be especially problematic in cases in which the industrial systems for which information is desired are located in remote environments that cannot be easily accessed by human operators, such as oil rigs, certain waste water facilities, automation systems associated with mining operations, or other such environments.

To address these and other issues, one or more embodiments of the present disclosure provide a conversation interface for remotely accessing manufacturing operation information using plain language message exchange. In one or more embodiments, a cloud-based query service can be configured to receive queries for information relating to one or more industrial systems or devices residing at one or more industrial plant facilities. The cloud-based service can be exposed to a chat interface (e.g., Slack, Cortana, Echo, or another type of messaging interface) allowing queries to be received via the chat interface formatted as plain language text or audio. The cloud-based service can synchronize the queries to one or more sibling on-premise services residing at respective plant facilities. The on-premise services translate the query and apply the translated query to local sources of manufacturing operation data. The on-premise service retrieves the requested information from the on-premise data sources and generates a response to the query based on the retrieved information, formatted as a plain language response. The reply is then sent to the cloud-based service, which routes the response to the originator of the query via the chat interface.

Figure 2:
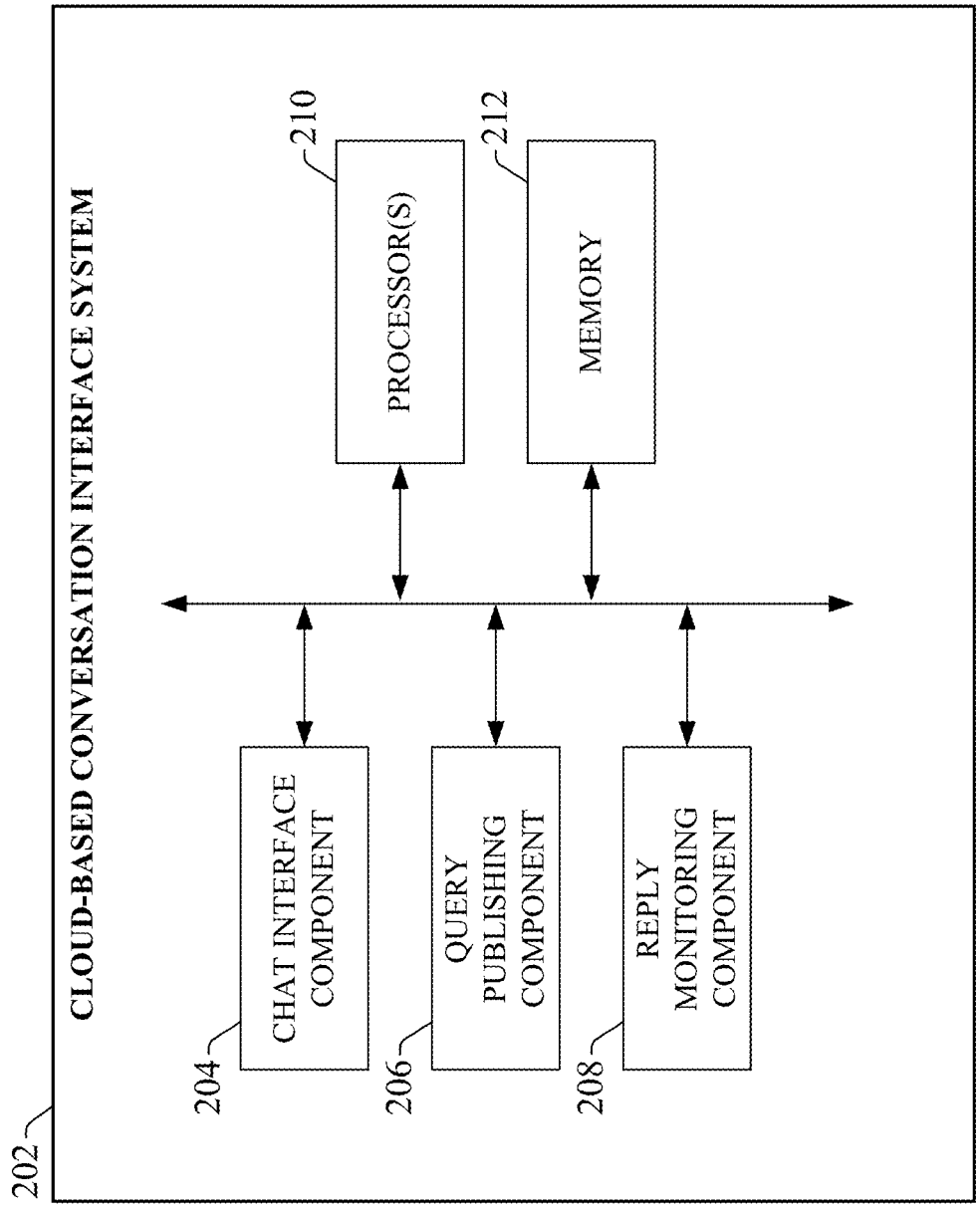
FIG. 2 is a block diagram of an example cloud-based conversation interface system.

FIG. 2 is a block diagram of an example cloud-based conversation interface system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud-based conversation interface system 202 can include a chat interface component 204, a query publishing component 206, a reply monitoring component 208, one or more processors 210, and memory 212. In various embodiments, one or more of the chat interface component 204, query publishing component 206, reply monitoring component 208, the one or more processors 210, and memory 212 can be electrically and/or communicatively coupled to one another to perform one or more of the functions of the cloud-based conversation interface system 202. In some embodiments, components 204, 206, and 208 can comprise software instructions stored on memory 212 and executed by processor(s) 210. Cloud-based conversation interface system 202 may also interact with other hardware and/or software components not depicted in FIG. 2. For example, processor(s) 210 may interact with one or more external user interface devices, such as a keyboard, a mouse, a display monitor, a touchscreen, or other such interface devices.

The chat interface component 204 can be configured to communicatively interface with one or more text-based or verbal chat applications via a cloud platform on which the system 202 executes. Suitable chat applications can include, but are not limited to Slack, Echo, Cortana, or other such instant messaging applications. The chat interface component 204 can receive queries from such chat applications relating to operation of industrial assets located at one or more industrial facilities.

The query publishing component 206 can be configured to analyze an incoming query received by the chat interface component 204, and determine one or more appropriate on-premise conversation interface agents to which the query is to be routed. The query publishing component 206 determines the appropriate on-premise agents based on such factors as the originator of the query (e.g., a chat group to which the originator belongs, a unique chat identifier of the originator, etc.) and the content of the query. The query publishing component 206 can then direct the query to the identified on-premise agents; e.g., by publishing the query to a publish-subscribe database. The reply monitoring component 208 can be configured to monitor for receipt of a response to the submitted query from the on-premise agent, and to pass the reply to the chat interface component 204 for delivery to the originator of the query via the chat application.

The one or more processors 210 can perform one or more of the functions described herein with reference to the systems and/or methods disclosed. Memory 212 can be a computer-readable storage medium storing computer-executable instructions and/or information for performing the functions described herein with reference to the systems and/or methods disclosed.

Figure 3:
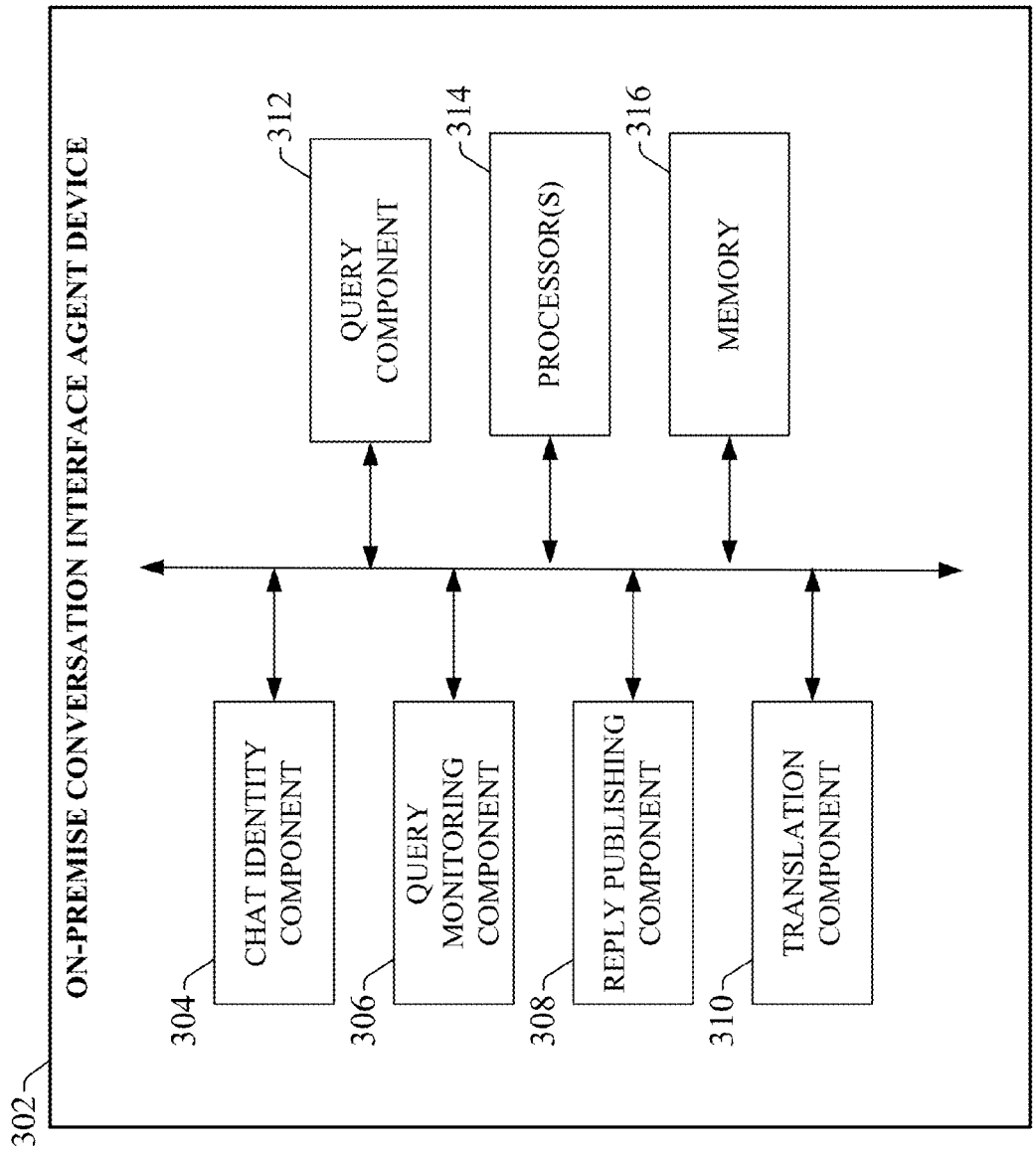
FIG. 3 is a block diagram of an example on-premise conversation interface agent device capable of interacting with cloud-based system.

FIG. 3 is a block diagram of an example on-premise conversation interface agent device 302 capable of interacting with cloud-based system 202 according to one or more embodiments of this disclosure. On-premise conversation interface agent device 302 can include a chat identity component 304, a query monitoring component 306, a reply publishing component 308, a translation component 310, a query component 312, one or more processors 314, and memory 316. In various embodiments, one or more of the chat identity component 304, query monitoring component 306, reply publishing component 308, translation component 310, query component 312, the one or more processors 314, and memory 316 can be electrically and/or communicatively coupled to one another to perform one or more of the functions of the on-premise conversation interface agent device 302. In some embodiments, components 304, 306, 308, 310, and 312 can comprise software instructions stored on memory 316 and executed by processor(s) 314. On-premise conversation interface agent device 302 may also interact with other hardware and/or software components not depicted in FIG. 3. For example, processor(s) 314 may interact with one or more external user interface devices, such as a keyboard, a mouse, a display monitor, a touchscreen, or other such interface devices.

The chat identity component 304 can be configured to assign and maintain one or more identities for the on-premise agent device 302 within a chat application environment. The identity of the agent device 302 may include, for example, one or more chat groups or teams to which the agent device 302 is assigned as well as a name assigned to the agent device 302. The identity of the agent device 302 allows other members of the chat group or team to direct queries to and receive responses from the agent device 302. Query monitoring component 306 can be configured to monitor for receipt or publication of queries from the cloud-based conversation interface system 202, and to pass such queries to the translation component 310. The reply publishing component 308 can be configured to direct query responses to the cloud-based conversation interface system 202 (e.g., by publishing the responses to a publish-subscribe database).

The translation component 310 can be configured to analyze a received query in order to determine the nature of the query and to identify the appropriate data sources that should be queried in order to generate a suitable response to the query. The query component 312 can be configured to submit the translated query to one or more local sources of manufacturing data in order to determine information being requested by the query (e.g., a machine or device status, a current or historical machine performance parameter, a telemetry value, etc.). The one or more processors 314 can perform one or more of the functions described herein with reference to the systems and/or methods disclosed. Memory 316 can be a computer-readable storage medium storing computer-executable instructions and/or information for performing the functions described herein with reference to the systems and/or methods disclosed.

Figure 4A:
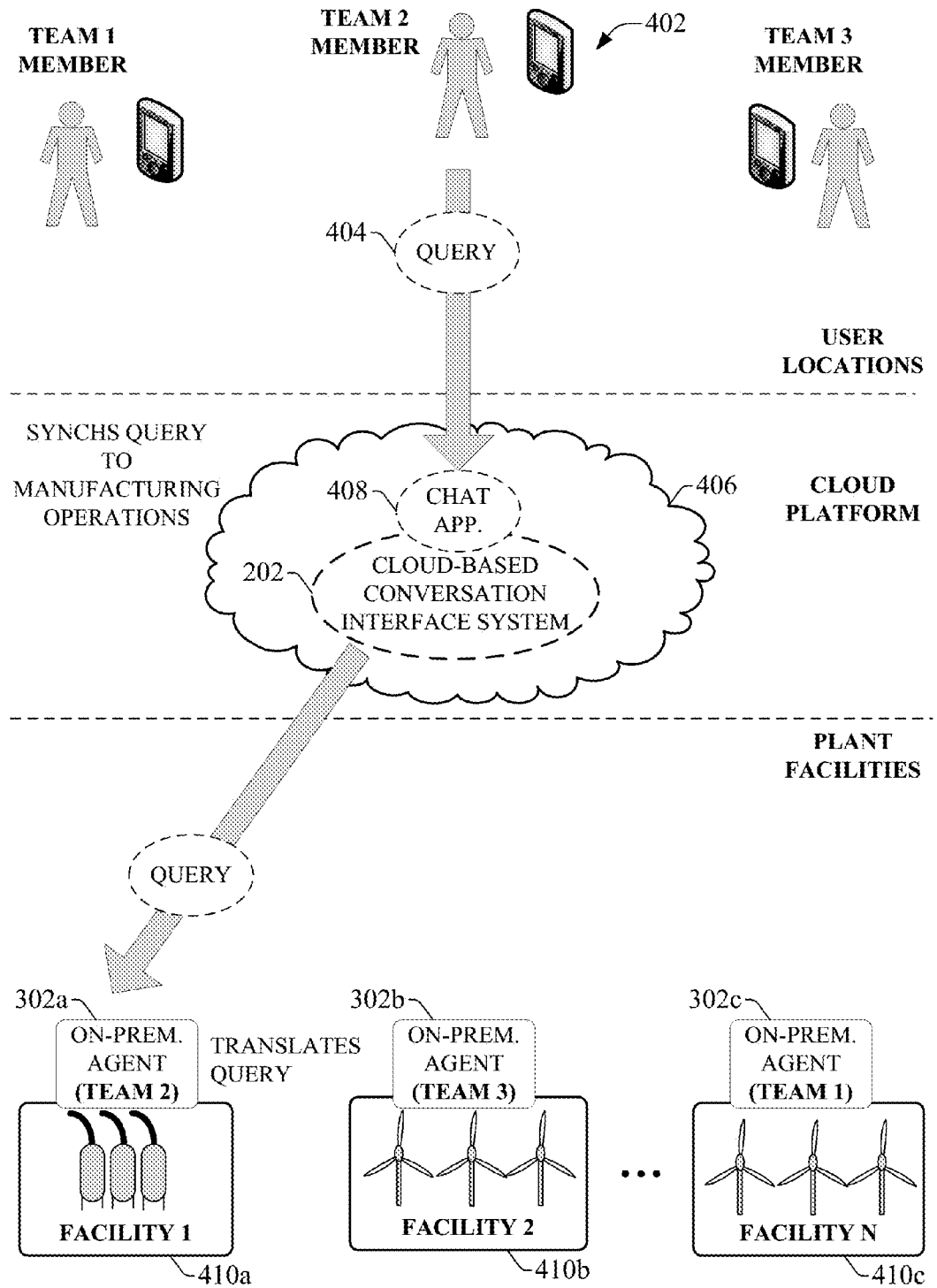
FIGS. 4a and 4b are diagrams illustrating a generalized, high-level architecture that allows conversational messages to be exchanged between users and industrial data sources.
Figure 4B:
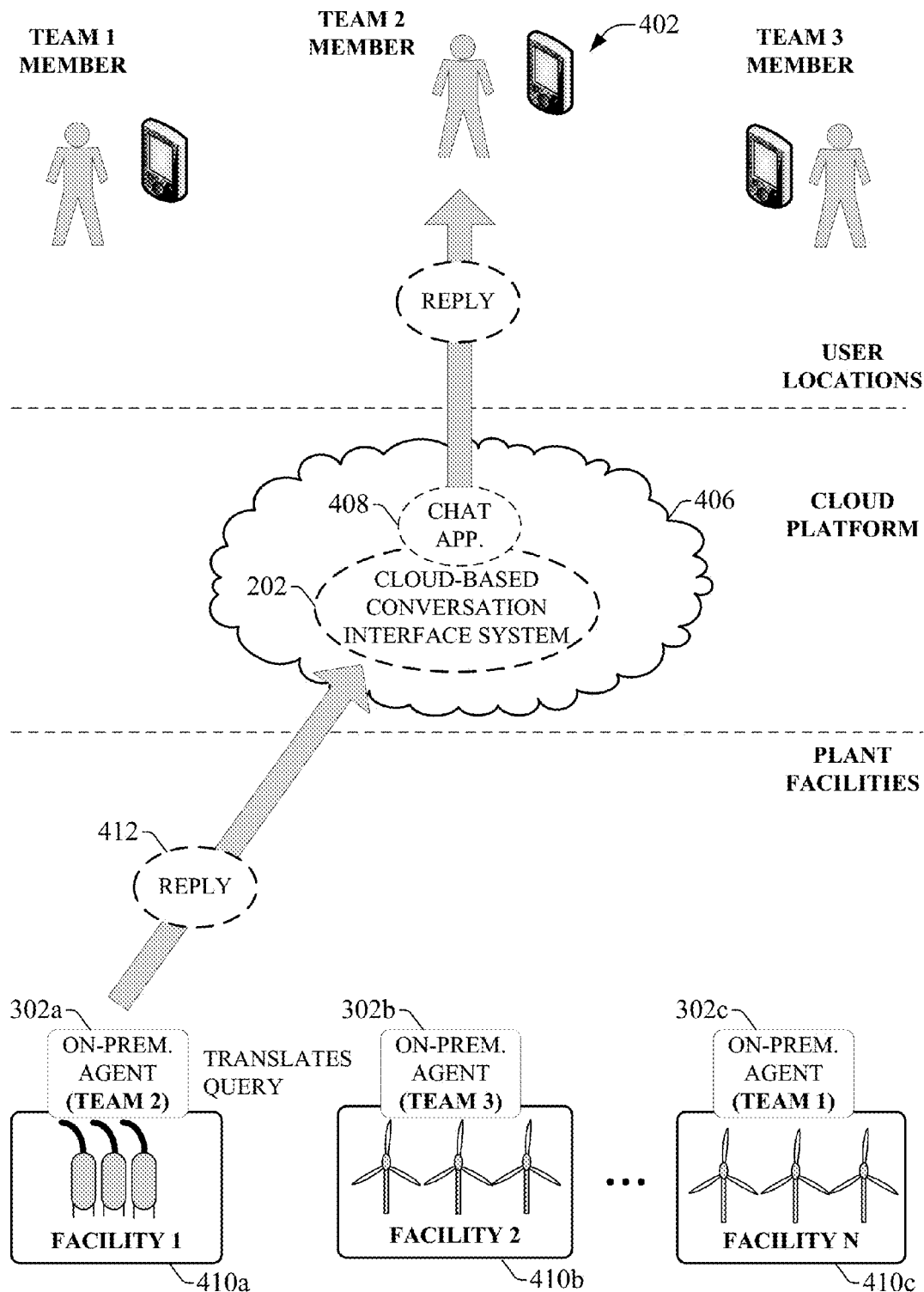

FIGS. 4a and 4b are diagrams illustrating a generalized, high-level architecture that allows conversational messages to be exchanged between users and industrial data sources according to one or more embodiments. As noted above, the cloud-based conversation interface system 202 resides and executes on a cloud platform 406. Cloud platform 406 can be a public cloud accessible via the Internet by devices having Internet connectivity and appropriate authorizations to utilize the services. Alternatively, cloud platform 406 can be a private cloud operated internally by an industrial enterprise. An example private cloud can comprise a set of servers hosting cloud services (e.g., the conversation interface services described herein) and residing on a corporate network protected by a firewall.

Cloud-based conversation interface system 202 can interface with a chat application 408 (e.g., via chat interface component 204) that also executes on cloud platform 406, or on a separate execution platform (FIGS. 4a and 4b depict an embodiment in which chat application 408 resides on the cloud platform 406). Chat application 408 can be substantially any suitable instant messaging application that facilitates instant message communication between multiple parties (e.g., Slack, Cortana, Echo, etc.). In addition to allowing instant messages to be exchanged between users within a defined chat group or team, interfacing the chat application 408 to the cloud-based conversation interface system 202 allows a user to direct messages to an on-premise conversation interface agent device 302 located at a plant facility 410. These messages can take the form of a plain language query 404 directed to an identifier associated with the on-premise agent device 302. Such queries may, for example, request a current status of a specified industrial machine, automation system, or device; request production statistics for a specified production line; or other such requests. Users can submit query 404 to the cloud-based system 202 via the chat application's interface—which is accessed by the user's client device 402 (e.g., a mobile phone or other portable personal device; a laptop computer, a tablet computer, a desktop computer, etc.)—in a similar manner as that used to submit instant messages to other users of the chat application 408.

One or more on-premise agent devices 302 (also referred to herein as analytic nodes) may be configured to exchange messages with the cloud-based system 202, where the on-premise agent devices 302 may be located at geographically diverse industrial facilities 410. Each on-premise agent device 302 is communicatively connected to one or more sources of current or historical manufacturing data (e.g., machine or device statuses; production statistics; key performance indicators; telemetry data such as temperatures, pressures, levels, or flow rates; machine downtime statistics; maintenance records; or other such data). Each on-premise agent device 302 is also assigned to a defined team corresponding to one of the user teams configured in the chat application 408. When a query 404 directed to the on-premise agent device 302 is received at the chat application 408, the chat interface component 204 of cloud-based system 202 receives the query, and the query publishing component 206 of system 202 directs the query to the appropriate on-premise agent device 302. The cloud-based system 202 may determine the appropriate destination on-premise agent device 302 based on the originator of the query (e.g., the team to which the originator belongs) and the type of information being requested. For example, in the case of text-based chat applications, the user may enter the message including the chat identifier of the target on-premise agent device in the message, in a similar manner to that used to direct a message to a human user. The query publishing component 206 of system 202 recognizes this identifier, and routes the message to the indicated on-premise agent device accordingly (in the case of verbal-based messaging systems, the user may speak the name of the on-premise agent identifier as part of the spoken message). Moreover, the cloud-based system may be configured to only allow messages to be exchanged between users and on-premise agent devices that are assigned to the same chat group or team. Accordingly, the system 202 may first confirm that the query has been received from an authorized user (e.g., a user designated to the same chat team as the on-premise agent device) before allowing the message to be synched to the on-premise agent device.

Upon receipt of the message from the cloud-based system 202, the on-premise agent device 302 parses and analyzes the query to ascertain the information being requested, and performs a search of the relevant industrial data sources at the local facility 410 in order to obtain the requested information. As shown in FIG. 4b, once the requested information has been located and obtained from local data sources, the on-premise agent device 302 generates a reply 412 conveying the requested information, formatted as a plain text instant message that includes the identifier of the originator of the message, and sends the reply to the cloud-based conversation interface system 202, which delivers the instant message reply to the user's client device 402 via the chat application interface. These data exchange aspects are described in more detail below.

In embodiments in which chat application 408 and cloud-based system 202 execute on a globally accessible platform (e.g., a public cloud platform), thereby allowing multiple users to access and communicate using the cloud-based systems, the chat application 408 may only allow messages to be exchanged between members who are designated as being members of a common team or group. Users of chat application 408 can be assigned to a particular team (e.g., Team 1, Team 2, Team 3, etc.) using the user configuration features of the chat application 408. Once assigned to a team, a user can use the chat application 408 to exchange instant messages with other members of that team. In an example scenario, employees of a given industrial enterprise may be segregated into different chat teams based on their roles or areas of responsibility, so that those members can exchange messages in connection their responsibilities. For example, maintenance personnel responsible for a particular production area may be assigned to a common team so that work-related communications can be exchanged between members of the team. Additionally, the on-premise agent device 302 that is configured to access manufacturing operational data from that particular work area can also be assigned to the team, so that the team members can exchange messages with the agent device in connection with retrieving status and operational information for automation systems and devices within that area. In the example depicted in FIGS. 4a and 4b, the three chat users are depicted as being assigned to different teams (Team 1, Team 2, and Team 3, respectively). Accordingly, only the member of Team 2 will be allowed to access on-premise agent device 302a, which is also assigned to Team 2 (agent devices 302b and 302c are depicted as being assigned to Team 3 and Team 1, respectively). The query publishing component 206 of cloud-based system 202 is configured to enforce these messaging rules.

In some embodiments, cloud-based system 202 may also be configured to provide conversation interface services to multiple industrial enterprises. In such embodiments, the system 202 can be configured to securely segregate messaging services between the different industrial enterprises, such that users associated with a particular industrial enterprise are prevented from viewing or communicating with users or on-premise agent devices associated with other industrial enterprises. In an example implementation, the cloud-based system 202 may support designation of hierarchical identifiers to each user and on-premise agent device 302, such that an agent or user identifier defines the industrial enterprise, chat team, and unique identifier for each agent or user.

Figure 5:
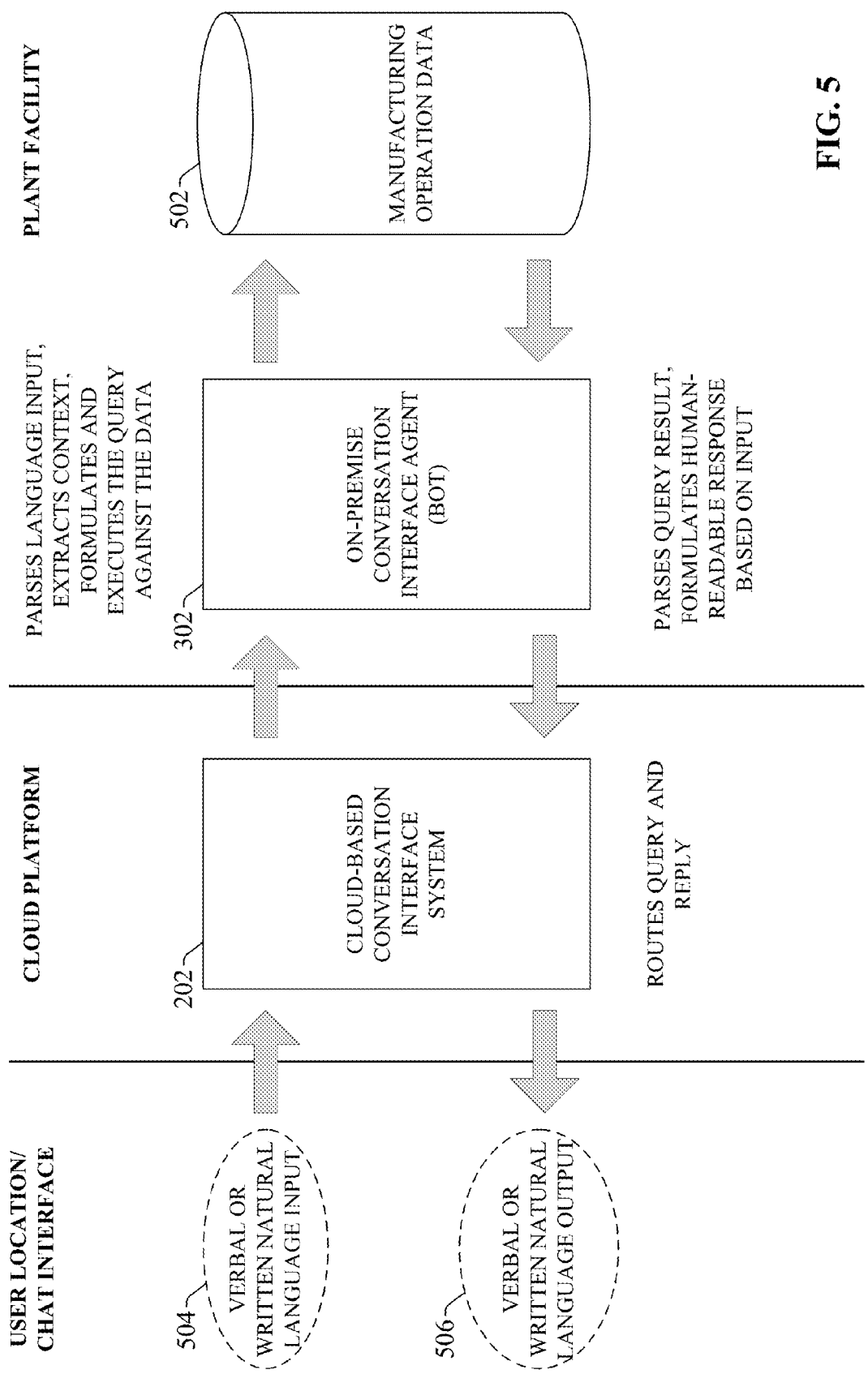
FIG. 5 is a diagram of example conversation message exchange processing.
Figure 6:
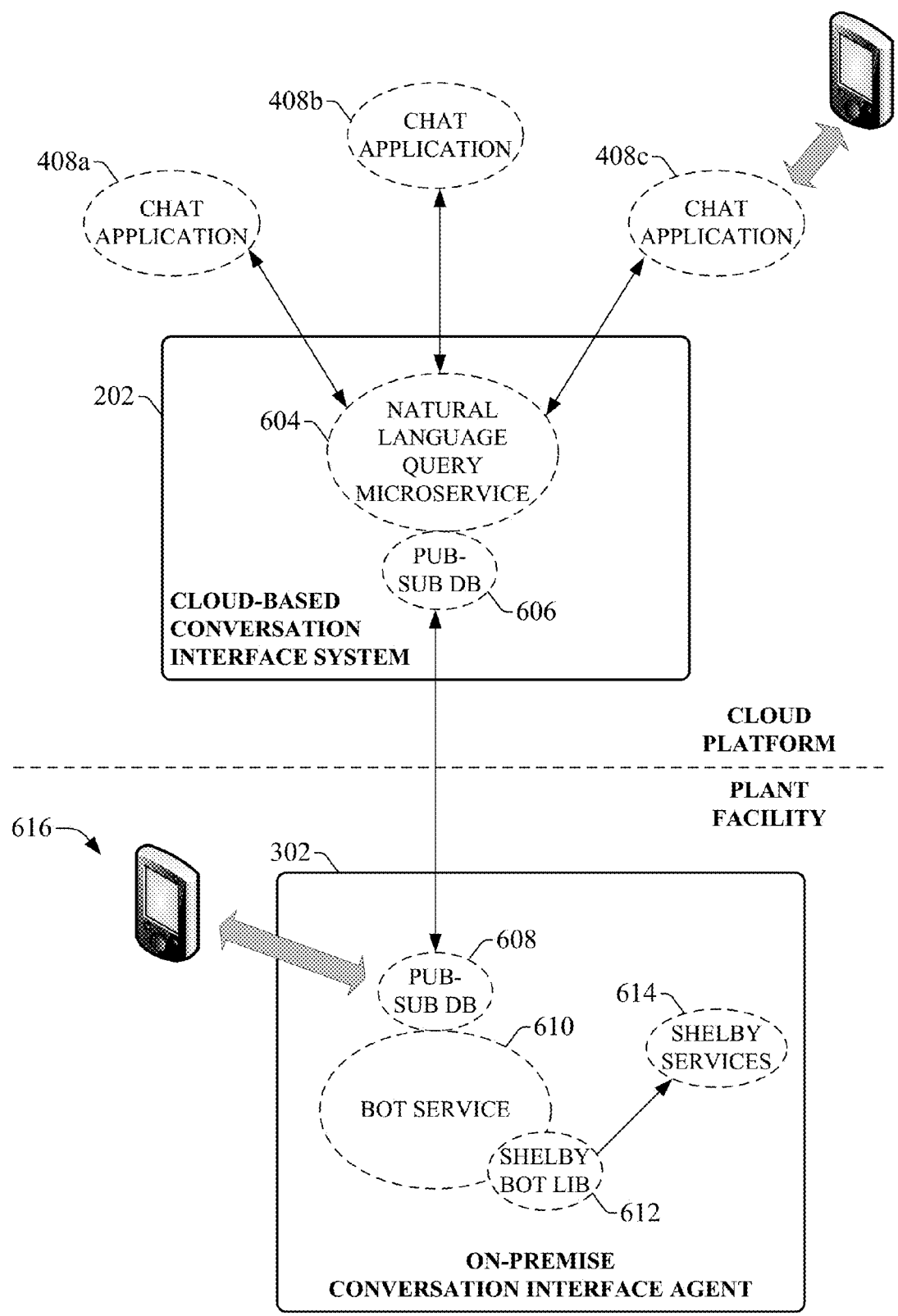
FIG. 6 is a diagram illustrating example services that can be implemented by one or more embodiments of a cloud-based conversation interface system and an on-premise conversation interface agent device.

FIG. 5 is a diagram illustrating an example conversation message exchange processing according to one or more embodiments. In general, cloud-based conversation interface system 202 serves as an external receiving interface for instant message inputs 504. These instant message inputs are submitted by users via their respective client devices, and are received by system 202 in the form of verbal or written natural language input in accordance with the input capabilities of the chat interface. In this regard, the chat interface component 204 of system 202 exposes the system 202 to the chat application that provides the interface. Turning briefly to FIG. 6, example services that can be implemented by one or more embodiments of the cloud-side system and on-premise agent are illustrated. As shown in this figure, the cloud-based system 202 (in particular, the chat interface component 204 of system 202) can implement a natural language query microservice 604 that exposes the system 202 to one or more chat applications 408, which provide the natural language input 504 to the system 202. Example chat applications that can interface with system 202 include, but are not limited to, Slack, Echo, Cortana, or other such natural language message exchange systems. Depending on the type of input supported by the chat application 408 from which the input 504 is received, the input may be in the form of natural language text (e.g., typed text or translated written text) or verbal input (e.g., in the case of speech-to-text systems).

Returning now to FIG. 5, the cloud-based system 202 receives the natural language input 504 and routes the input 504 to a selected on-premise conversation interface agent device 302 located at a plant facility. In some embodiments, the cloud-based system 202 can select the appropriate on-premise agent device 302 based on a user identifier associated with the originator of the query (or, more specifically, a defined team or group to which the user identifier is assigned) and an agent identifier specified in the input 504, where the agent identifier uniquely identifies the target on-premise agent device 302 within the group of identities associated with the team. As noted above, the query publishing component 206 of system 202 can be configured to enforce suitable security rules that prevent access to the on-premise agent device by unauthorized users. For example, the query publishing component 206 can be configured to route an incoming message to a given on-premise agent device only if the message includes the agent's identifier, and the originator of the message is designated to the same chat team as the on-premise agent.

In some embodiments, the cloud-based system 202 (in particular, the query publishing component 206 of system 202) can direct the input 504 to the on-premise agent device 302 using a publish-subscribe paradigm. Such embodiments of the cloud-based system 202 can have an associated publish-subscribe database 606 (see FIG. 6). The query publishing component 206 can published incoming queries or commands to this publish-subscribe database 606 as a message, and synchronize the message to a local copy of the publish-subscribe database 608 associated with the on-premise agent device 302 at the plant facility. Each on-premise agent that is configured to communicate with cloud-based system 202 has an associated local copy of the publish-subscribe database 608. When the query publishing component 206 of cloud-based system 202 has identified the on-premise agent to which the incoming message is directed (e.g., based on detection of the agent device's identifier within the message), system 202 publishes and synchronizes the message to the local publish-subscribe database 608 associated with that agent device 302 for local processing.

Returning to FIG. 5, when the query monitoring component 306 of on-premise agent device 302 detects that a new message has been synchronized to its local publish-subscribe database 608, the agent's translation component 310 parses the plain language content of the message in order to determine the nature of the request or command represented by the message. To this end, the translation component 310 can identify and extract keywords or contextual information from the message that can be used to determine the information being requested or the command being issued. For example, an incoming message requesting information regarding a current status of a motor drive may read "Is Drive 1 running?" Upon detecting this message in the local publish-subscribe database 608, translation component 310 can extract from the query the name of the device for which information is requested (e.g., "Drive 1"), and/or any contextual information that can assist in identifying either the device for which information is requested or the type of information being requested. In the present example, the word "running" indicates that the data item being requested for Drive 1 is the current operating mode of the drive (e.g., running, idle, faulted, etc.). More particularly, the incoming message is seeking confirmation of a particular operating mode (Running mode). This extracted information is used by the query component 312 of the on-premise agent device 302 to generate and issue a query to the appropriate source of manufacturing operation data 502 known to include the current operating status of the indicated drive. In some embodiments, the query component 312 may determine the locations of requested data items based on associated mapping data that defines locations of data items associated with respective industrial devices, automation systems, and/or production lines. Such mapping data may define the source devices (e.g., industrial devices, historian systems, etc.), as well as the data tags or registers on those devices, that correspond to respective items of industrial information. Upon ascertaining the particular item of industrial information being requested by an incoming message, the query component 312 can access this mapping data in order to determine the data source and data tag or register from which to retrieve the requested information. It is to be appreciated, however, that other techniques for determining the locations of requested data items are within the scope of one or more embodiments of this disclosure.

In some embodiments, the source of manufacturing operation data 502 may be one or more local data collection or historian devices that aggregates data from multiple industrial devices within the plant facility. These sources of aggregated plant floor data may be separate devices that are communicatively connected to the agent device 302 (e.g., over a plant network), such that the agent device 302 can access and query the data sources across the network. Alternatively, the agent 302 itself may include data aggregation functionality, such that the agent device 302 collects and stores data from multiple industrial devices or automation systems on local storage associated with the agent. In such embodiments, the agent's query component 312 submits queries to this local source of aggregated plant data. In yet other embodiments, the agent device 302 may be configured to submit queries directly to the industrial devices themselves in order to retrieve data requested by the incoming message.

Figure 7:
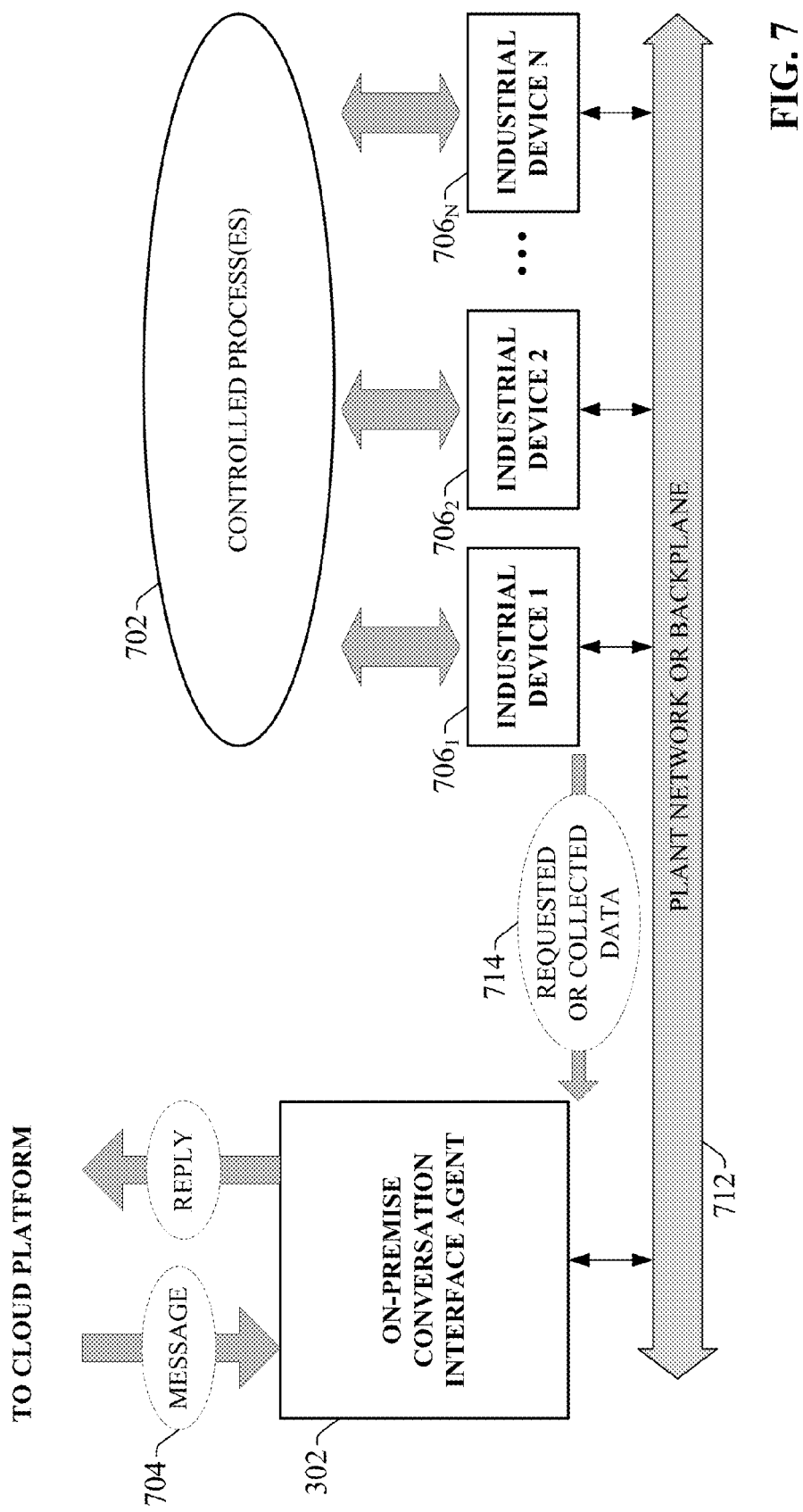
FIG. 7 is a diagram illustrating a configuration in which an on-premise conversation interface agent retrieves data directly from industrial devices via a plant network.

FIG. 7 is a diagram illustrating a configuration in which the on-premise agent device 302 retrieves data directly from the industrial devices (as opposed to retrieving data from a separate data aggregation or historian device). In this example, an automation system comprises a plurality of industrial devices $706_1$-$706_N$ which collectively monitor and/or control one or more controlled processes 702. The industrial devices $706_1$-$706_N$ respectively generate and/or collect process data relating to control of the controlled process(es) 702. For industrial controllers such as PLCs or other automation controllers, this can include collecting data from telemetry devices connected to the controller's I/O, generating data internally based on measured process values, etc. The industrial devices 706 may also store vendor-defined or user-defined configuration parameters (e.g., setpoint values, tuning parameter values, mode settings, communication settings, etc.), which can also be made accessible to the agent device 302.

In this example, the on-premise agent device 302 resides on the same plant network 712 as industrial devices 706. As noted above, in some scenarios on-premise agent device 302 can be configured to periodically or continuously collect operational, statistic, and/or configuration data 714 from the industrial devices 706, and to store the aggregated data locally for the purpose of retrieving relevant subsets of the data in response to subsequent query messages 704. Alternatively, the on-premise agent device 302 can be configured to query the data stored on the devices 706 in response to receipt of a query message 704.

Returning now to FIG. 5, the query component 312 of agent device 302 queries the manufacturing operation data source(s) 502 (e.g., data historians, local aggregated data, distributed industrial devices, etc.) for the information requested by the query input 504. The query component 312 may also query for additional information related to the specific information requested by the incoming message, in order to provide a more informative reply to the originator of the request. The agent's reply publishing component 308 then formulates a human-readable response based on the query results and the wording of the message input 504. For example, if the incoming message was a request for Drive 1 status information—formulated as the question "Is Drive 1 running?"—the query component 312 may retrieve the current Drive 1 status (in this example, the manufacturing operating data indicates that Drive 1 is currently in Running mode) as well as information specifying a total duration for which Drive 1 has been operating in its current Running state. The reply publishing component 308 may then use this retrieved information to formulate a reply reading "Drive 1 is currently running, and has run without fault for the past two minutes." The reply publishing component 308 can design the syntax of the reply based on part on the language of the original query. For example, since the original query specifically requested conformation of the running status for Drive 1, if Drive 1 was determined to be in a non-running state (e.g., idle, abnormal, etc.), the reply publishing component 308 may begin the reply with a negative answer ("No") before providing additional information about the current state of the drive. Once the reply has been formulated, the reply publishing component 308 of the on-premise agent device 302 sends the reply to the cloud-based system 202; e.g., by publishing the reply to the local copy of the publish-subscribe database 608.

Turning again to FIG. 6, a bot service 610 implemented by the on-premise agent device 302 can carry out functions associated with receiving and interpreting incoming message from the cloud-based system 202, and generating reply messages in response to the incoming messages. The bot service 610 can be implemented, for example, by the query monitoring component 306, the reply publishing component 308, the translation component 310, and the chat identity component 304 of the on-premise agent. The chat identity component 304 is configured to assign and maintain an identity for the on-premise agent device 302 that is recognizable by the chat application 408 to which the cloud-based interface system 202 is linked. The identity assigned to the on-premise agent device 302 can include an assignment to a particular chat team or group, thereby allowing other chat users within the same team to exchange messages with the on-premise agent 302 as though the agent was another user of chat application 408. In the examples described herein, the on-premise agent device 302 is assigned the identity SHELBY. The bot service 610 associated with the on-premise agent device 302 can include an associated bot lib file 612, which may link to other local services 614 of the agent.

At the cloud-based interface system 202, the reply monitoring component 208 detects that the reply has been published to the cloud-side copy of the publish-subscribe database 606, and routes the reply message to the originator of the incoming message via the interface of the chat application 408. The cloud-based system tracks the incoming queries and corresponding reply messages, so that the reply messages from the on-premise agent device 302 are routed to the correct chat user.

In addition to exchanging conversational messages with the cloud-based conversation interface system 202, some embodiments of the on-premise agent device 302 can also exchange messages directly with client devices (e.g., client device 616) via the local version of the publish-subscribe database 608 without the need to route the messages through the cloud platform. For example, client device 616 may execute a chat application capable of communicatively connecting to the local publish-subscribe database 608 on the on-premise agent device 302 (e.g., over a wireless network). If the user of client device 616 is logged into the chat application as a member of the same chat team or group as agent device 302, the client device can submit message to, and receive replies from, the on-premise agent device 302 via this local connection.

Figure 8:
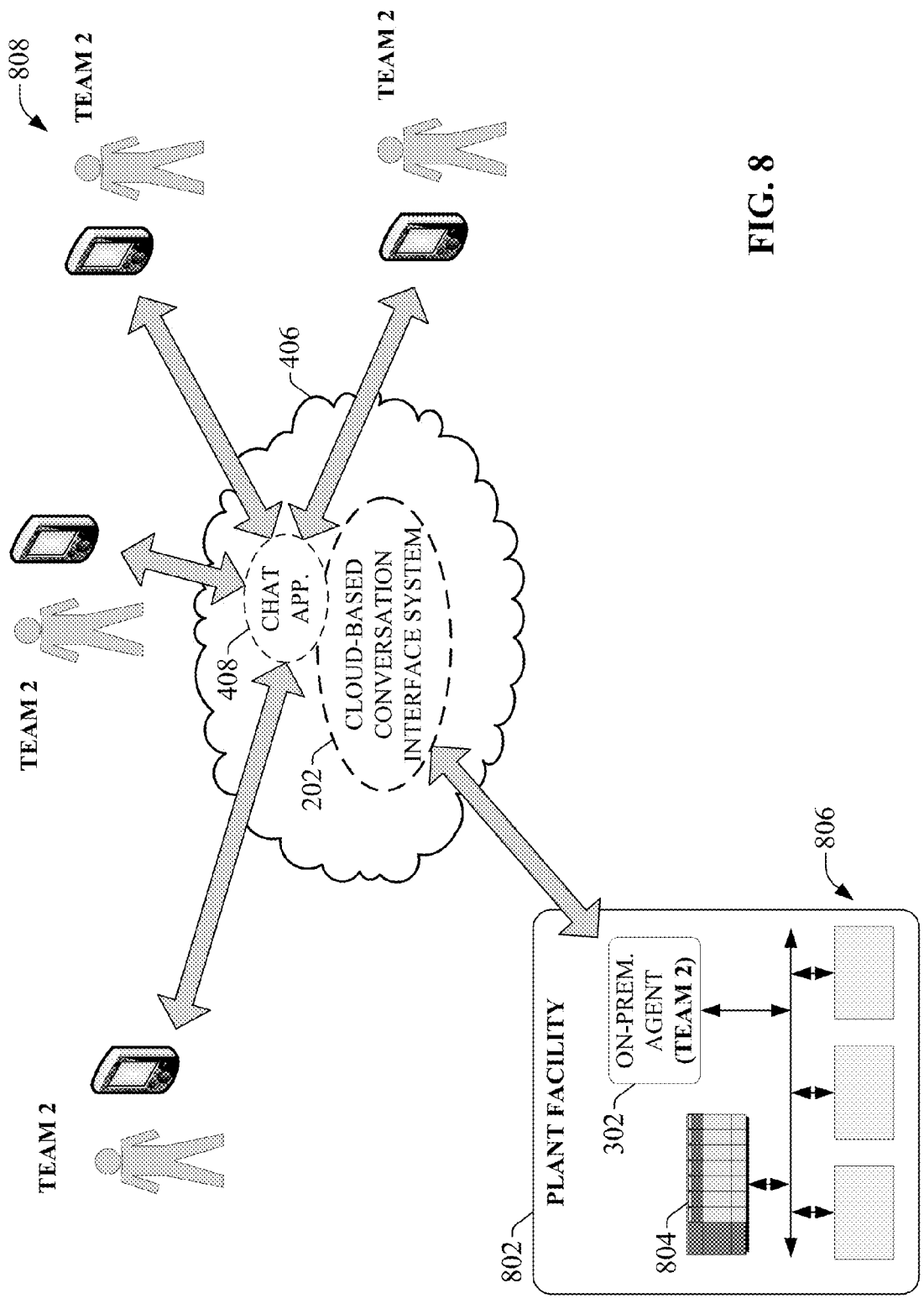
FIG. 8 is a diagram illustrating a generalized chat architecture that allows members of a team to exchange conversation messages with an on-premise conversation interface agent device.

As noted above, the chat identity component 304 allows the on-premise agent device 302 to be assigned an identity (e.g., SHELBY in the examples described herein) and designated to a chat team (e.g., Team 2) so that chat users who are members of the same chat team can exchange messages with the on-premise agent via the cloud-based system as though the agent were another chat user. FIG. 8 is a diagram illustrating a generalized chat architecture that allows members of a team to exchange conversation messages with an on-premise agent device 302. In this example, a number of users 808 have been assigned to a common team (Team 2) using the configuration tools of the chat application 408 to which the cloud-based interface system 202 is linked. On-premise agent device 302, which resides at a plant facility 802, has also been assigned to Team 2, allowing the members of Team 2 to exchange conversational messages with the agent. On-premise agent device 302 is configured to communicatively access and retrieve data generated by a set of industrial devices on the plant floor at facility 802, including one or more industrial controllers 804 (e.g., PLCs or other types of industrial controllers) and/or other types of industrial devices 806 (e.g., motor drives, telemetry devices and meters, vision systems or other quality check systems, safety controllers or other safety devices, etc.). Agent device 302 may also have access to other sources of relevant information, including but not limited to work order databases, inventory databases, device documentation, knowledgebases, or other such data sources. As noted above, on-premise agent device 302 may access the data generated by or stored on these devices by querying a separate data collection device or historian that collects and stores data items from the various industrial devices. Alternatively, the on-premise agent device 302 may reside on a common plant network with the industrial devices, and access the data items directly from the devices.

Figure 9:
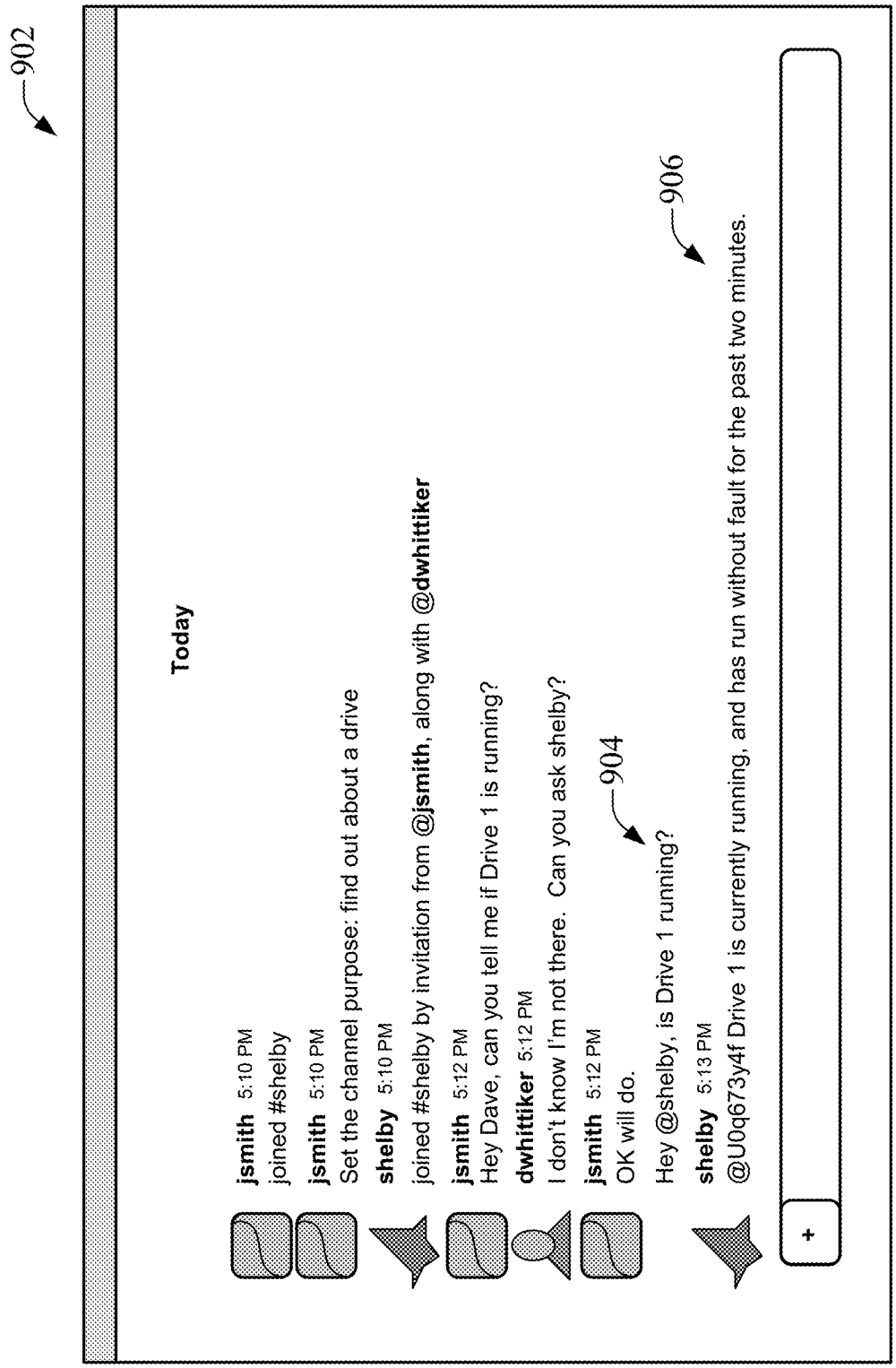
FIG. 9 is an example chat interface that interacts with cloud-based conversation interface system to facilitate message exchange between team members and on-premise agent devices.

Chat application 408 allows users 808 to exchange instant messages with one another through interaction with the chat application's user interface. FIG. 9 is an example chat interface 902 that interacts with cloud-based conversation interface system 202 to facilitate message exchange between team members and on-premise agents. In this example, two users—jsmith and dwhittiker—are members of the same chat team. Since the chat application and cloud-based interface services reside on a cloud platform 406 accessible from any location having access to the cloud, these users may be located at the plant facility 802 or located elsewhere. User jsmith initially defines a new channel for private message exchange, and invites user dwhittiker and the on-premise agent (shelby) to join the channel. User jsmith begins by sending a message to user dwhittiker asking about the status of a motor drive (Drive 1). When dwhittiker indicates his inability to report on the status of Drive 1, user jsmith sends a message directed to the on-premise agent shelby, asking if Drive 1 is running. User jsmith formulates this message 904 in plain language format ("Is Drive 1 running?"), including the identity of the on-premise agent device preceded by an @ symbol (i.e., @shelby).

As described above in previous examples, cloud-based system 202 synchronizes this message to the appropriate on-premise agent device 302 (e.g., by publishing the message to the publish-subscribe database 606 associated with the identified agent shelby), and the on-premise agent parses and interprets the message as a request for the status of Drive 1. On-premise agent shelby queries the appropriate manufacturing operation data source for the requested information (either by retrieving the status information directly from Drive 1 itself over the plant network, or by retrieving the information from a separate data collection device), as well as for additional contextual information to be included in the response; namely, the time duration for which Drive 1 has been in its current state. Shelby then formulates a response 906 that includes the requested status information as well as the contextual information ("Drive 1 is currently running, and has run without fault for the past two minutes."), and sends this message to the cloud-based interface system 202 (e.g., via the publish-subscribe database), which causes the chat application 408 to render the message on the interface 902 under the communication channel.

Figure 10:
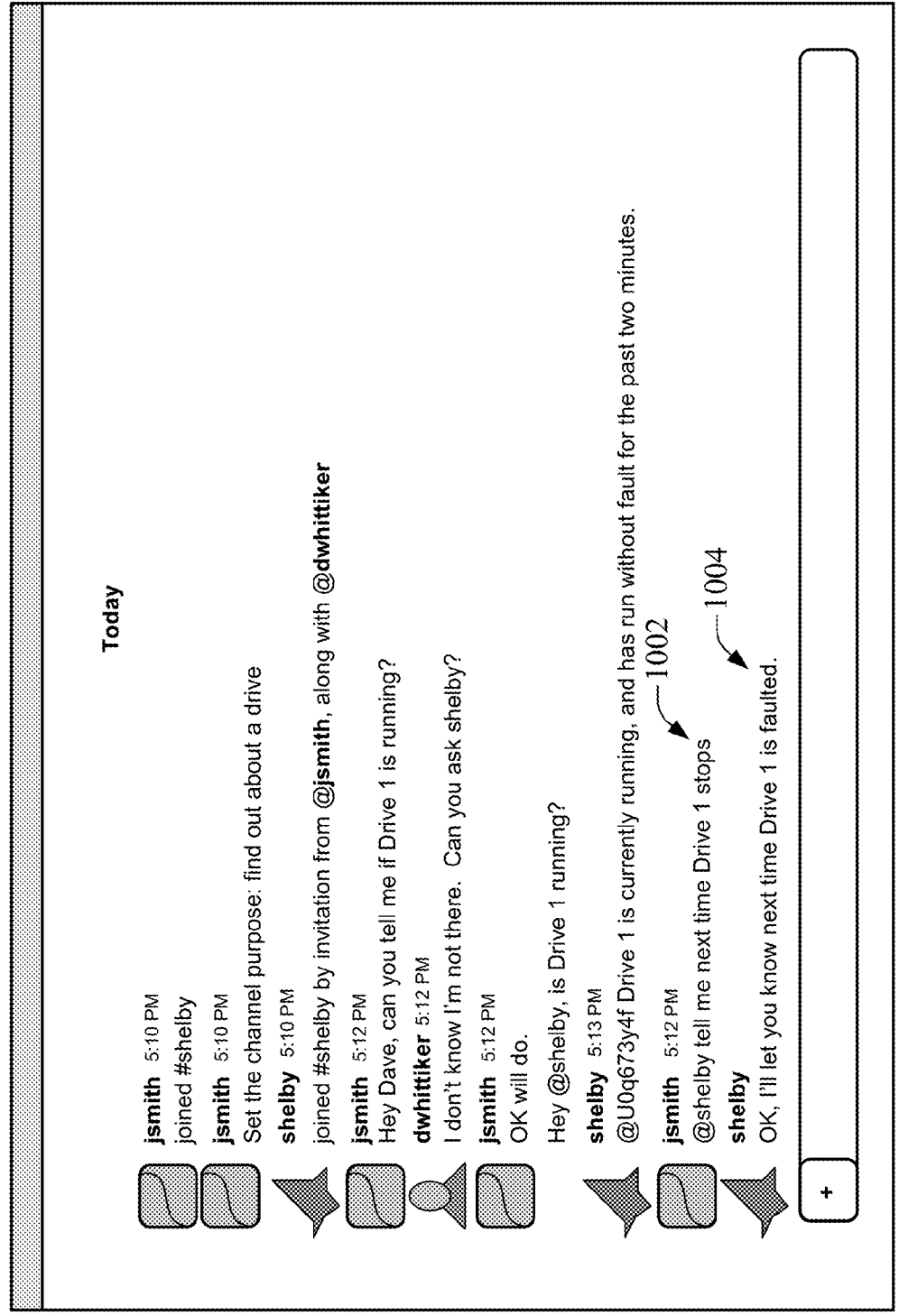
FIG. 10 is an example chat interface depicting remote configuration of an on-premise agent device to monitor a device status and to generate a notification message when the device status satisfies a criterion.

In the example illustrated in FIG. 9, a user initiates the conversation with the on-premise agent device 302 in order to obtain desired information. The on-premise agent device 302 can also be configured to initiate conversations with one or more users in response to detected conditions. Such agent-initiated conversations can be carried out in accordance with preset instructions provided to the agent device 302 via the chat interface. FIG. 10 depicts a subsequent conversation exchange between user jsmith and on-premise agent shelby that configures the on-premise agent to initiate a conversation at a future time in response to a defined condition. In this example, following the request for confirmation of Drive 1's running status, user jsmith sends a subsequent message 1002 to the on-premise agent device 302 requesting to be informed when Drive 1 stops ("Tell me next time Drive 1 stops."). The on-premise agent parses and interprets this message 1002 as a request to send a notification message to user jsmith at a future time when the indicated drive stops running. In this regard, based on parsing and analysis of the language of an incoming message, the agent's translation component 310 is capable of distinguishing between messages that represent a request for currently available information that can be retrieved immediately and provided to the originator of the request as a reply, and messages that represent requests to be informed of a future event.

Upon receipt of message 1002 and based on a determination that the message 1002 represents a request to be informed of a future conditions (a fault in Drive 1), the on-premise agent will begin monitoring the appropriate data item from the one or more accessible manufacturing operation data sources. The on-premise agent also sends a reply message 1004 confirming the user's request. In accordance with request message 1002, the next time the on-premise agent detects that the monitored data item corresponding to the faulted status of Drive 1 indicates a "Faulted" status, the agent will generate and send a suitable notification message directed to user jsmith via the cloud-based conversation interface system 202. In this way, the conversation interface system allows a user to remotely configure notification criteria via an instant message interface. It is to be appreciated that other types of notification criteria can be submitted to and implemented by the on-premise agent. For example, a user may instruct the on-premise agent to send a notification message when a specified production goal has been reached, when an energy utilization by an industrial process has exceeded a threshold value specified in the request message, when a specified key performance indicator for an industrial process satisfies a specified condition, or other such notification criteria.

Although the example interfaces depicted in FIGS. 9 and 10 represent text-based chat interfaces, the techniques described herein are also suitable for verbal-based messaging systems. In such embodiments, the cloud-based system 202 can be configured to translate verbally-inputted messages into text-based messages (e.g., using any suitable speech-to-text techniques) prior to performing analysis on the messages. In an example implementation, users can speak the identifier of the target on-premise agent device prior to speaking the query or request message to be sent to the agent. The cloud-based system 202 can convert this speech to text and identify the agent identifier contained in the translated message. Processing by the cloud-based system and the on-premise agent can then proceed as discussed above.

Figure 11:
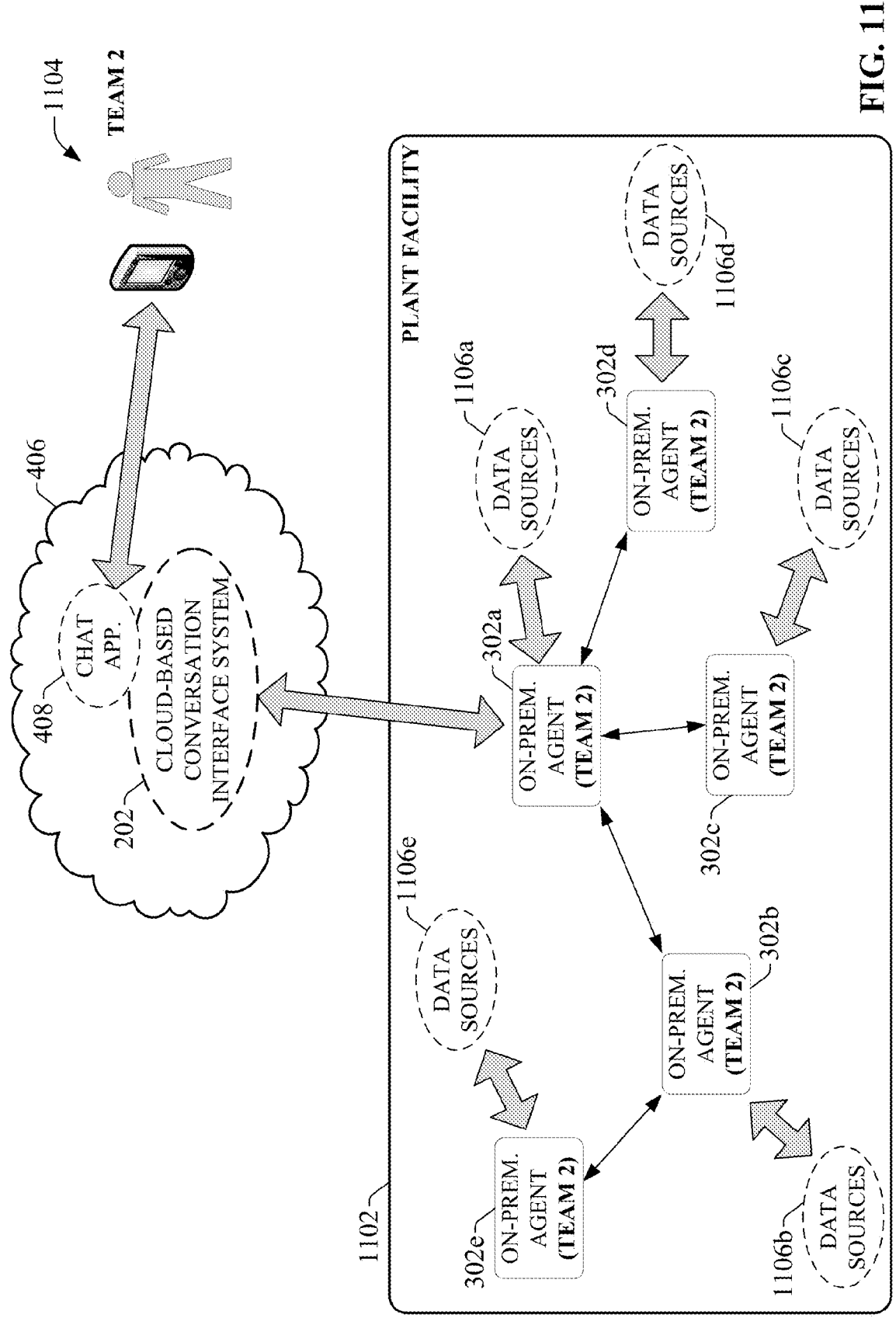
FIG. 11 is a diagram illustrating an example architecture in which multiple on-premise agent devices are distributed and networked within a plant facility.

The foregoing examples depict a single on-premise agent device residing at a given industrial facility to provide on-premise message processing services in association with the cloud-based interface system 202. However, in some embodiments, a network of two or more on-premise agent devices may be deployed throughout a plant facility. FIG. 11 is a diagram illustrating an example architecture in which multiple on-premise agent devices 302 are distributed and networked within a plant facility 1102. In this example, each on-premise agent device 302 has access to a particular set of data sources 1106, which may not be accessible by other agent devices. In this regard, the total set of data available throughout the plant facility is segmented and made available to a particular on-premise agent device 302. Segregation of data sources in this manner may be useful if the data sources reside on different networks or at different locations within the plant facility 1102. For example, some data sources 1106 relating directly to operation of industrial automation or control systems may reside on an operations technology (OT) network (e.g., a plant network on which industrial devices associated with the industrial automation systems reside), while other data sources 1106 relating to business or administrative operations (e.g., inventory databases, work order databases, work schedules, etc.) may reside on a separate corporate network. Accordingly, separate on-premise agent devices 302 may be established to access these different sets of data sources 1106.

In the example depicted in FIG. 11, only one on-premise agent device—302a—is interfaced to the cloud-based conversation interface system 202, with other on-premise devices 302b-302e being networked either directly or indirectly (via other on-premise devices) to device 302a. This yields a mesh of on-premise agent devices that render all data sources 1106a-1106e available via the cloud-based interface system 202. The distributed agent devices 302 share a common identity (e.g., Shelby), so that query or request messages directed to this common identity will be automatically handled by any of the on-premise agent devices 302 required to process the query or request, even though only one agent device (302a) is interfaced to the cloud-based system 202.

Each on-premise agent device 302 represents an analytic node of the mesh network. In an example configuration, each on-premise device 302 may store and maintain mesh network map information that identifies the other nodes on the mesh network. When a message directed to the mesh identity (Shelby) is received from the cloud-based system 202, the on-premise agent device 302a that interfaces with the cloud-based system processes the message, but may delegate tasks to one or more of the other agent devices 302b-302e in connection with processing the query or request represented by the message. For example, if the incoming message is a request for information located on the set of data sources 1106e, which is not accessible to agent device 302a, agent device 302a will route the request, via the mesh network connections, to the agent device 302e having access to the relevant set of data sources 1106e, thereby delegating the task of retrieving the requested information to another node on the mesh network. Note that, in this scenario, the request is routed through an intermediate mesh node, agent device 302b.

Routing of message processing tasks between nodes of the mesh network can be carried out by the agent devices 302 based on the shared mesh network map information maintained on each device 302. This map information may include, for example, identity information for each agent device 302 on the mesh. This identity information may be a node-level identifier that is separate from the chat identifier to which all the devices belong, and which is unique to each device within the context of the mesh network. The map information may also include information identifying the sets of data sources 1106 that are accessible to each agent device 302.

If a data retrieval task has been delegated to one of the agent devices 302b-302e by the primary agent device 302a (the device that communicates with the cloud-based system), the retrieved information is returned from the device that retrieves the data to the primary agent device 302a over the mesh network. The primary agent device 302a then formulates the reply message based on the return data and sends this reply message to the cloud-based system 202 (e.g., by publishing the message to the publish-subscribe databased 608).

In some embodiments, since the primary on-premise agent 302a is the only node device that exchanges messages with the cloud-based system, device 302a may be the only device that maintains a local copy of the publish-subscribe database 608. In such embodiments, the primary on-premise agent device 302 is initially the only node on the mesh network to be notified of the incoming message. The primary on-premise agent device 302 will then parse and analyze the message to determine the nature of the query, and delegate any necessary data retrieval tasks to other devices 302b-302e on the mesh network if necessary.

In other embodiments, all agent devices 302a-302e on the mesh network may be notified of an incoming message from the cloud-based system substantially simultaneously. In such embodiments, each agent device 302 will parse and analyze the message independently, and determine whether any individual action by that agent device is necessary based on the nature of the request contained in the message (e.g., based on whether the information being requested is within the purview of that agent device). Any agent devices 302 capable of handling the request will retrieve the requested information from its set of data sources 1106, and return the requested information to the primary agent device 302 for formulation and sending of the reply message to the cloud-based system 202. Also in such embodiments, any on-premise agent device 302 that assumes responsibility for handling a request may also delegate certain processing tasks to other agent devices on the mesh network if necessary. For example, primary processing of a message requesting a status of a safety device (e.g., a light curtain) may be handled by one of the agent devices—e.g., device 302c—having access to this safety status information. However, in order to formulate a more informative response, the handling agent device 302c may also request supplementary information from a different agent device 302 on the mesh network (e.g., a current operating mode of a machine being protected by the safety device, a duration of time that the machine has been in this mode, etc.). Once this supplementary information is received, the handling agent device 302c (or the primary agent device 302a) can include this information in the reply message together with the requested safety device status (e.g., "The #1 Headline Leak Test Station light curtain is broken. The Leak Test Station has been faulted for 36 minutes.").

Depending on the mesh network configuration and the nature of the incoming message, some requests may be capable of being handled by multiple agent devices 302 on the mesh network (e.g., if multiple agent devices 302 have access to the information being requested by the message). In such scenarios, the primary on-premise agent device 302a may be configured to resolve cases in which responses are received from multiple agent devices 302. Any suitable criteria can be used to handle processing of multiple responses received from respective multiple agent devices, including but not limited to formulating the reply message based on the first received response, formulating the reply message based on an aggregation of information from the multiple responses, formulating the reply message based on the response having a highest determined accuracy, etc.

Some query messages from the cloud-based system 202 may also require responses from all agent devices 302 that make up the mesh network. Such messages may include conversation interface diagnostic messages requesting identity, configuration, or status information for the agent devices 302 on the mesh network. For example, a user may send a request for network address information for the respective agent devices 302 making up the mesh network (e.g., formulated as the message "Shelby, where are you?"). In response to receipt of such a message at the mesh network, each agent device 302 will send its network address as a separate reply message routed to the user via the cloud-based system 202 (e.g., "Shelby bot running on <hostname1> is at <network address 1>", "Shelby bot running on <hostname2> is at <network address2>", etc.).

Also, although FIG. 11 depicts all on-premise agent devices 302 as residing within a single plant facility 1102, the mesh network may extend across multiple plant facilities that make up an industrial enterprise, such that each facility includes one or more on-premise agent devices. In an example implementation, these geographically distributed agent mesh networks may not be directly linked to one another between facilities; instead, each facility-specific mesh network is linked to the cloud-based interface system 202, which routes messages between users of chat application 408 and the respective mesh networks. The set of geographically distributed agent mesh networks are collectively assigned a common chat identity (e.g., Shelby), such that messages from the chat application 408 that are directed to the collective chat identity are routed by the cloud-based system 202 to a selected one or more of the mesh networks based on contextual information contained in the message.

For example, when the cloud-based interface system 202 receives a query or request message from the chat application 408 directed to the Shelby identity, the cloud-based system 202 can determine which plant facility to which the message should be routed, based on contextual information gleaned from the incoming message. This contextual information may include, for example, an explicit reference to the name of the relevant plant facility, as in the query message, "What's the status of the conveyor drive on line 1 at the Cleveland plant?" In this example, based on the user's reference to the Cleveland plant, the cloud-based system 202 will route the message to the on-premise agent device (or mesh of agent devices) located at the Cleveland plant for processing. In this regard, the cloud-based system 202 may have knowledge of one or more plant identifiers, names, or aliases for each of the plants within a given industrial enterprise, such that messages containing any of this identifying information will be routed to the correct location (e.g., messages containing either the formal name of a plant facility or the name of the city in which the plant resides will be routed to the same facility). In another example, the contextual information may omit the name of the plant facility, but may include a reference to a specific device, machine, or production line that is specific to only one of the plant facilities. In such a scenario, the cloud-based system 202 will key on the uniqueness of the indicated device, machine, or production line to route the message to the appropriate plant facility for processing by the on-premise agent devices at that facility.

Further regarding such distributed, multi-facility systems, some query messages may require aggregation of data from multiple different industrial facilities. For example, a user may submit the message: "What was the total product count for model A65 brake pads yesterday?" If the indicated model of product is produced at two or more facilities, the cloud-based system 202 can route the message all identified facilities that produce the indicated model. Based on analysis of this message, the on-premise agent devices (or mesh network of devices) at each of the facilities can retrieve the part counts for the indicated part for the previous day from the appropriate data sources at each facility, and return this information to the cloud-based system. Once responses have been received from all facilities to which the messages had been sent, the cloud-based system can formulate a reply to the original message that includes a sum total of part counts received from the facilities. The cloud-based system may also include a break-down of the individual part counts reported by each facility (e.g., "A total of 1853 Model A65 brake pads were produced yesterday. This includes 589 pads from the Cleveland plant, and 1264 pads from the Urbana plant.").

In addition to allowing the user to enter query or request messages into the system in a freeform manner, some embodiments of the cloud-based system can also support guided querying of the conversation interface system by dynamically generating suggested messages that may be yield useful information based on the user's current focus of attention. In an example embodiment, the system 202 may insert such dynamically generated messages into manufacturing operation report pages, where the pre-formulated messages are selected to be relevant to the topics being presented to the user via the report pages. FIG. 12 is an example report page 1202 that allows a user to select and submit suggested query messages to the conversation interface system. Report page 1202 may be generated, for example, by a reporting application that retrieves manufacturing operation data from one or more data sources and presents this information via the user's client device according to a pre-formatted report layout. The report page 1202 can be generated on-demand in response to a request from the user, or generated automatically at predefined times (e.g., at the end of a work shift to include operating statistics collected for the previous shift; in the morning to include statistics for the previous day, etc.). Some or all of the data presented on the report page can be obtained from the appropriate data sources using the same conversation infrastructure described above, albeit using submitted queries generated automatically by the reporting system as opposed to user-entered messages.

The example report page 1202 depicted in FIG. 12 includes sections corresponding to different topics, including detected networking issues, total durations for which monitored devices were in a faulted state, worst performing devices, etc. In addition, each topic section has associated therewith one or more recommended message queries 1204 designed to retrieve, via the conversation interface system, additional information relevant to the corresponding topic. For example, the network issue section includes two pre-formulated query buttons 1204a—a first query button designed to retrieve the identities of devices configured for half-duplex and full-duplex ("What are the devices?") and a second query button designed to retrieve the duration of time during which duplex mismatch has been present among devices on the network. The device failure duration section of the report page includes a query button 1204b designed to identify the monitored devices that spend the most amount of time in the faulted state. When one of these recommended query buttons—e.g., button 1204b—is selected, the report page submits the selected query message to the cloud-based system 202, which process the message as described above in previous examples. When the results are received from the conversation interface system, the report page 1202 can render a chat window 1206 that presents the results of the submitted query as reply messages from the conversation interface system. The chat window 1206 can include a text entry field 1208 that allows the user to continue the conversation with the interface system using free-form query messages, which will be processed as described in previous examples.

The recommended messages can be generated dynamically by the system based on the current or historical data being presented in the respective report sections. For example, based on the reported information that the total amount of time spend in a faulted state by the monitored devices is excessive, the system can dynamically generate and recommend the message "Which devices are faulted the most?" based on an inference that the user will want to know the identities of the devices that experience the most faults.

Figure 13:
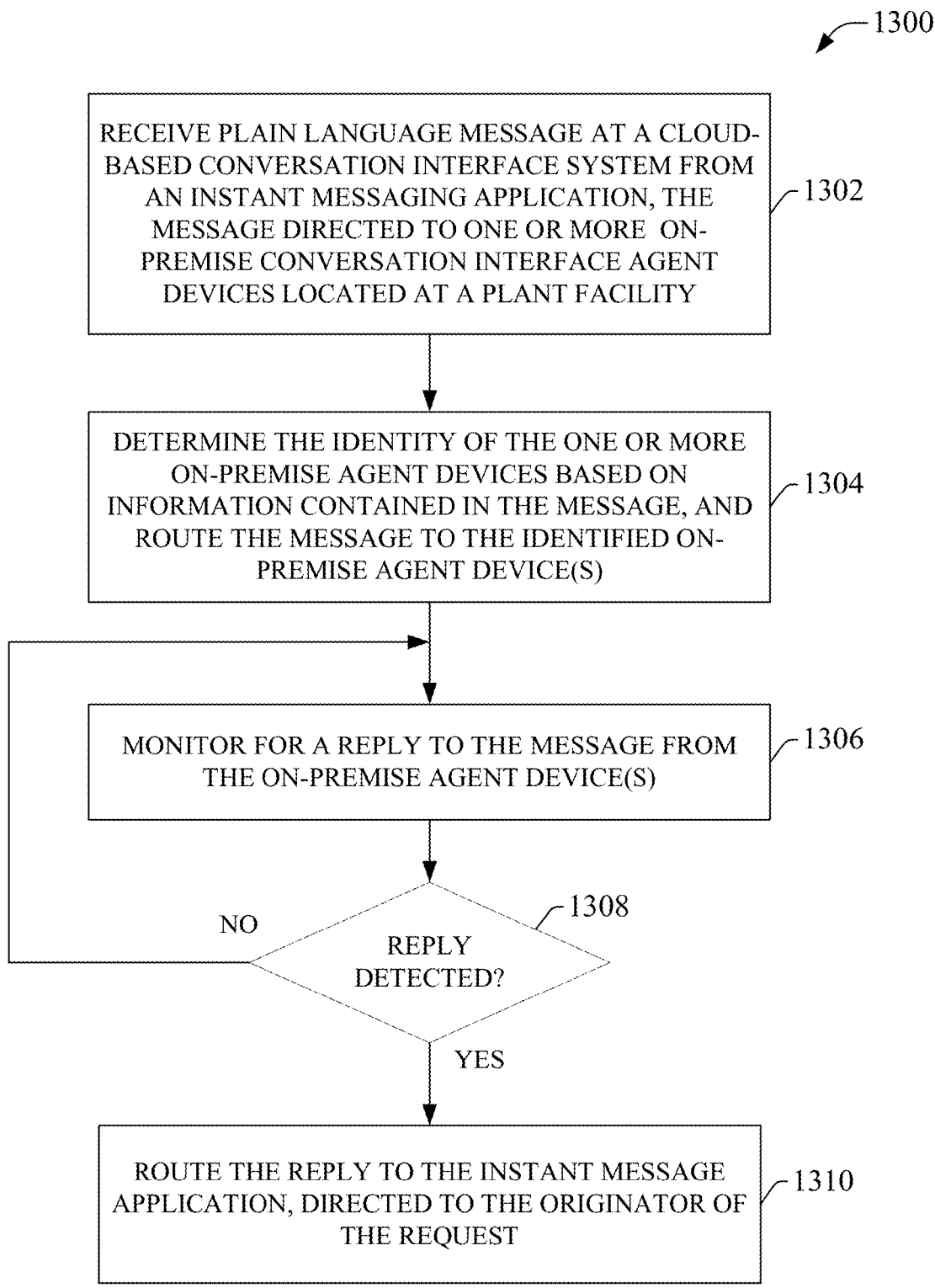
FIG. 13 is a flowchart of an example methodology for routing of conversation messages between a user and an industrial conversation agent.
Figure 14:
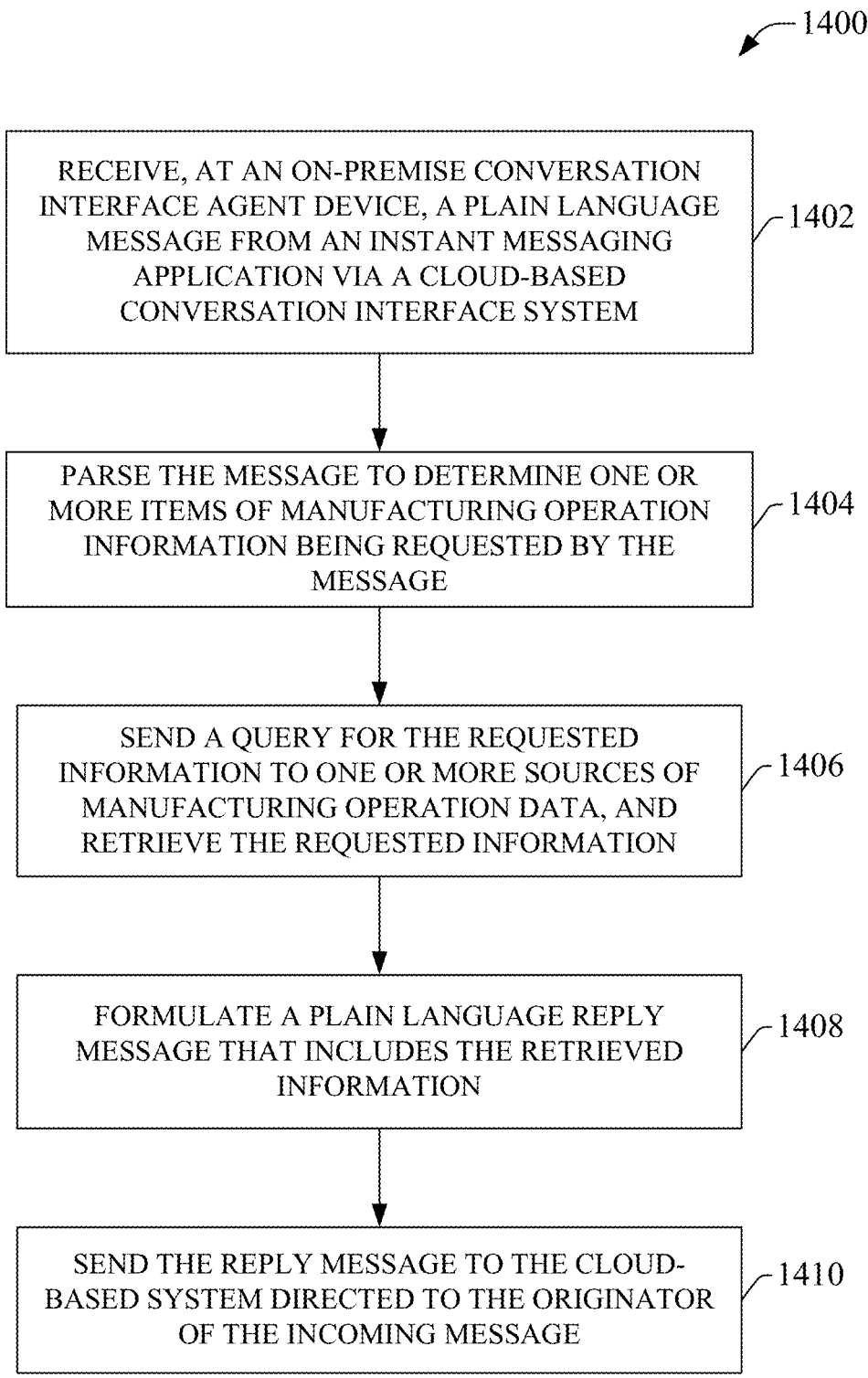
FIG. 14 is a flowchart of an example methodology for processing instant message requests for information relating to an industrial machine or process.
Figure 15:
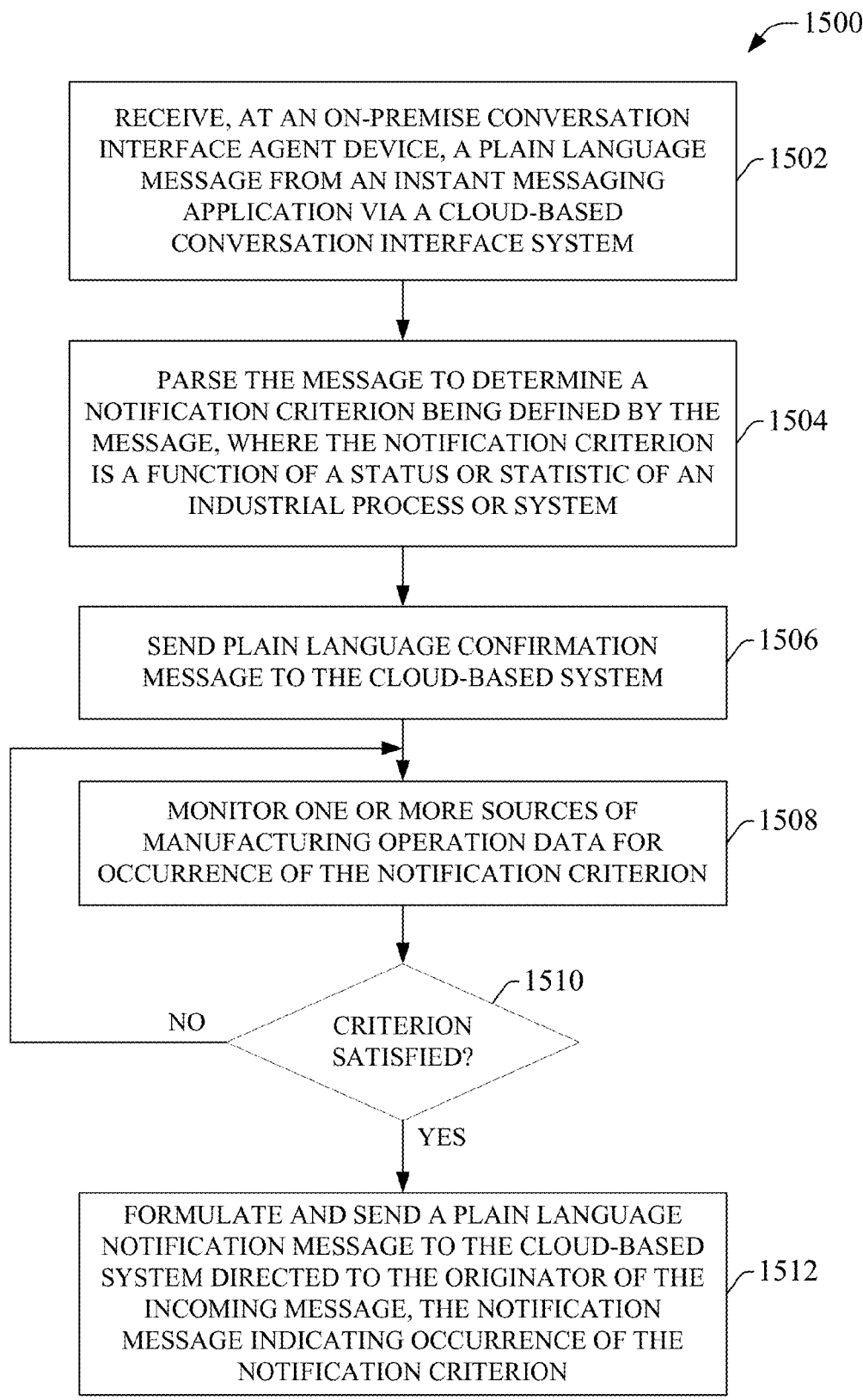
FIG. 15 is a flowchart of an example methodology for remotely instructing an on-premise device to send a notification in response to occurrence of a defined event at an industrial facility.

FIGS. 13-15 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for routing of conversation messages between a user and an industrial conversation agent. Initially, at 1302, a plain language message is received at a cloud-based conversation interface system from an instant messaging application, where the message is directed to an on-premise conversation interface agent device located at a plant facility, or to a mesh network of on-premise conversation interface devices located at the facility. The message may be, for example, a request for status or operational information relating to an automation system, device, or machine running at the plant facility. At 1304, the identity of the one or more on-premise agent devices is determined based on information contained in the message, and the message is routed to the identified on-premise agent device(s) by the cloud-based conversation interface system. In an example embodiment, the cloud-based system can route the incoming message to the one or more on-premise agent devices by publishing the message to a publish-subscribe database, which synchronizes to a local version of the publish-subscribe database maintained on the on-premise agent device(s). However, other techniques for synchronizing the message to the on-premise device are also within the scope of one or more embodiments described herein. The on-premise agent devices to which the message is directed may be a single on-premise device located at a given industrial facility, or may be a set of interconnected agent devices located at the facility. In another implementation, the agent devices may be distributed across multiple industrial facilities, and are assigned a collective identifier known to the cloud-based interface system. In such embodiments, the cloud-based system will determine which the distributed on-premise agent devices should handle processing of the message based contextual information contained in the message, and route the message to the selected agent devices for on-premise processing.

At 1306, the cloud-based system monitors for a reply to the message from the on-premise agent device(s); e.g., by monitoring for a reply to the message to be published to the publish-subscribe database. At 1308, a determination is made as to whether such a reply message has been received. If no reply message is received (NO at step 1308), the methodology returns to step 1306 and monitoring continues. Alternatively, if a reply message is received (YES at step 1308), the methodology proceeds to step 1310, where the cloud-based system routes the reply to the instant message application, directed to the originator of the request.

FIG. 14 illustrates an example methodology 1400 for processing instant message requests for information relating to an industrial machine or process. Initially, at 1402, a plain language message is received at an on-premise conversation interface agent device located at a plant facility, the message being received from an instant messaging application via a cloud-based conversation interface system. At 1404, the incoming message is parsed by the on-premise agent device to determine one or more items of manufacturing operation information being requested by the message. The information being requested by the message may be, for example, a request for a machine or device status, current or historical operating statistics (e.g., production counts, operating speed, current energy usage by an industrial process, a number of machine downtimes within a specified period of time, etc.), or other such information relating to operation of an industrial manufacturing operations.

At 1406, the on-premise agent device sends a query for the requested information to one or more sources of manufacturing operation data, and the requested information is retrieved from the one or more sources. In an example implementation, the data sources may be the relevant industrial devices themselves, and the on-premise agent device can access and retrieve the data from the appropriate data registers in the industrial devices over a plant network. In another example implementation, the on-premise agent device can retrieve the data from a separate data collection device that historizes data from multiple industrial devices deployed in the plant facility. In yet another example, the on-premise agent device itself may maintain a local data store of industrial data collected from various industrial devices, and can submit queries for requested information to this local data store.

Moreover, in configurations in which the on-premise agent device is part of a mesh network of multiple interconnected on-premise agent devices, the agent device may delegate at least a portion of the data retrieval processing to one or more other on-premise agent devices on the mesh network. In this regard, if the agent device determines, based on analysis of the message, that all or a portion of the information being requested is accessible by a different agent device on the mesh network, the agent device can send a request message to the other agent device requesting retrieval of the desired information. In response, the other agent device can retrieve and return this information to the original agent device for inclusion in a reply message.

At 1408, the on-premise agent device formulates a plain language reply message that includes the information retrieved at step 1406. At 1410, the on-premise agent device sends the reply message to the cloud-based system from which the incoming message was received, such that the reply message is directed to the originator of the incoming message.

FIG. 15 illustrates an example methodology 1500 for remotely instructing an on-premise device to send a notification in response to occurrence of a defined event at an industrial facility. Initially, at 1502, a plain language message is received at an on-premise conversation interface agent device located at a plant facility, the message being received from an instant messaging application via a cloud-based conversation interface system. At 1504, the incoming message is parsed by the on-premise agent device to determine a notification criterion being defined by the message. The message may be, for example, a request to send a notification message in response to a determination that a particular industrial device or machine specified in the message has transitioned to a particular state also specified in the message (e.g., faulted, abnormal, running, etc.). Other example notification requests can include, but are not limited to, requests to send a notification when a specified production goal has been reached (e.g., a product count, an inventory level, a fill level, etc.), requests to send a notification when an energy utilization by an industrial process has exceeded a specified threshold value, request to send a notification when a specified key performance indicator for an industrial process (e.g., a speed, an energy consumption rate, a temperature, etc.) satisfies a specified condition, or other such notification criteria.

At 1506, the on-premise agent device sends a plain language confirmation message to the cloud based system, the confirmation message indicating that the notification request has been received and understood. At 1508, the on-premise agent device begins monitoring one or more sources of manufacturing operation data at the plant facility for occurrence of the notification criterion, in accordance with the received message. For example, the on-premise agent device can directly or indirectly monitor the appropriate one or more data items (e.g., industrial controller tags, telemetry device data registers, etc.) that indicate whether the defined notification criterion has been satisfied.

At 1510, a determination is made regarding whether the notification criterion has been satisfied, based on the monitoring performed at step 1508. If the notification criterion has not been satisfied (NO at step 1510), the methodology returns to step 1508 and the monitoring continues. Alternatively, if the notification criterion has been satisfied (YES at step 1510), the methodology proceeds to step 1512, where the on-premise agent device sends a plain language notification message to the cloud-based system, the message being directed to the originator of the original request message, and indicating occurrence of the notification criterion. The cloud-based system can then deliver the notification message to the user via an instant message application linked to the cloud-based system.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
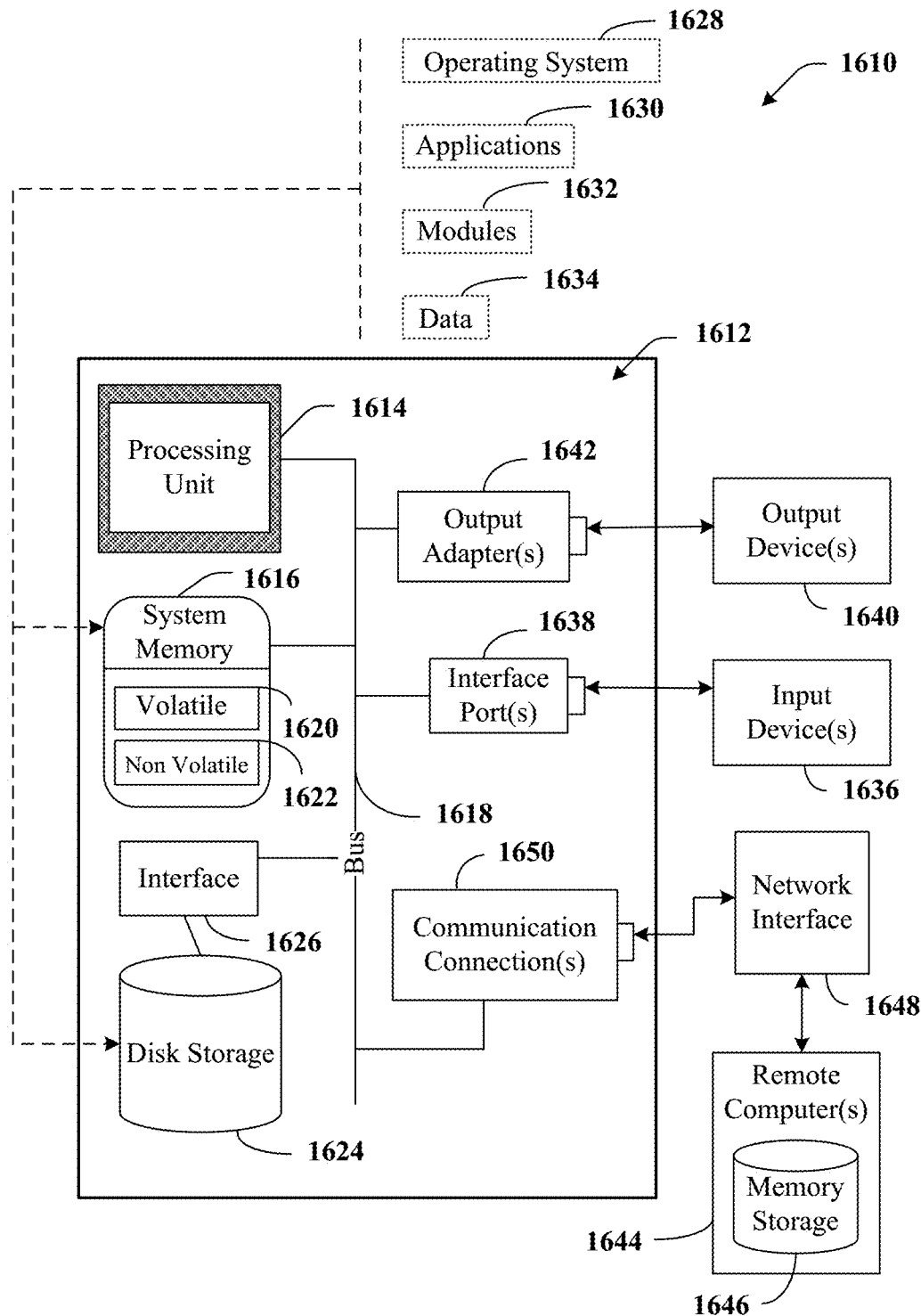
FIG. 16 is an example computing environment.
Figure 17:
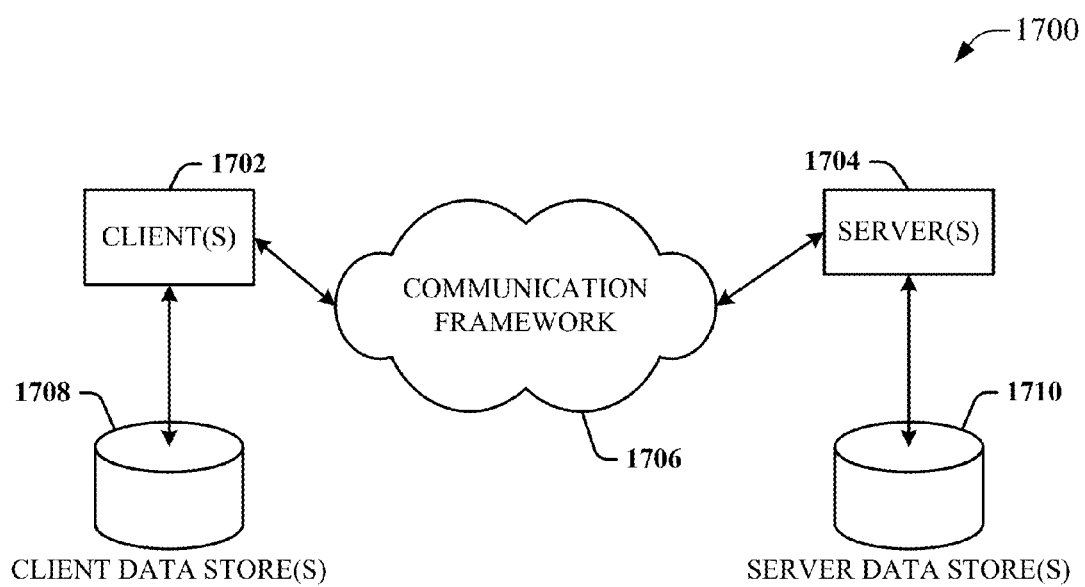
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1416, and a system bus 1618. The system bus 1618 couples system components including, but not limited to, the system memory 1416 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1934 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1946 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1648 can also encompass near field communication (NFC) or Bluetooth communication.

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s)

1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for remotely interacting with manufacturing operation information, comprising:
    a memory that stores executable components;
    a processor, operatively coupled to the memory, that executes the executable components, the executable components comprising:
        a query monitoring component configured to detect receipt of a plain language request message from a cloud-based conversation interface system, wherein the plain language request message originates from an instant message application that interfaces with the cloud-based conversation interface system and comprises a request to be informed when one or more conditions of an industrial process specified by the plain language request message become satisfied, and
        the one or more conditions comprise at least completion of a production goal by the industrial process;
        a translation component configured to determine the one or more conditions and a source of industrial device data indicative of the one or more conditions based on an analysis of the plain language request message;
        a query component configured to, in response to receipt of the plain language request, begin monitoring a subset of data items, on the source of the industrial device data, indicative of the one or more conditions of the industrial process based on the analysis of the plain language request message; and
        a reply publishing component configured to, in response to a determination by the query component that a condition of the one or more conditions of the industrial process has been satisfied, formulate a plain language notification message stating that the condition has been satisfied, and send the plain language notification message to the instant message application via the cloud-based conversation interface system.

2. The system of claim 1, further comprising a chat identity component configured to define an identifier for the system, wherein the identifier causes the cloud-based conversation interface system to recognize the system as a member of a chat group defined for the instant message application.

3. The system of claim 1, wherein the one or more sources of industrial device data comprise at least one of an industrial device residing on a same network as the system or a data collection device that collects and stores industrial device data generated by a set of industrial devices.

4. The system of claim 1, wherein the query monitoring component is configured to detect the receipt of the plain language request message based on a monitoring of a publish-subscribe database to which the cloud-based conversation interface system publishes the plain language request message.

5. The system of claim 4, wherein the reply publishing component is configured to send the plain language notification message to the cloud-based conversation interface system by publishing the plain language notification message to the publish-subscribe database.

6. The system of claim 1, wherein
    the query monitoring component is further configured to detect receipt of a plain language query message from the cloud-based interface system, wherein the plain language query message originates from the instant message application,
    the translation component is further configured to determine, based on another analysis of the plain language query message, one or more items of manufacturing operation information being requested by the plain language query message, the query component is further configured to query the one or more sources of industrial data for the one or more items of manufacturing operation information, and the reply publishing component is further configured to formulate a plain language reply message based on the one or more items of manufacturing operation information.

7. The system of claim 1, wherein the one or more conditions further comprise at least one of a fault condition on an industrial device of the industrial process, utilization of energy by the industrial process in excess of a threshold value specified by the request message, or satisfaction of a specified condition by a key performance indicator of the industrial process.

8. The system of claim 6, wherein the query component is further configured to, in response to a determination that at least one data item of the one or more items of manufacturing operation information is accessible by another system, send an instruction to the other system to retrieve the at least one data item.

9. The system of claim 6, wherein
the query component is further configured to, in response to determining that the one or more items of manufacturing operation information comprise a current operating status of the industrial process or an industrial device of the industrial process, retrieve time duration information identifying a duration of time for which the industrial process or the industrial device has been in the current operating status, and the reply publishing component is further configured to include the time duration information in the plain language reply message.

10. A method for remotely accessing status and operational information for an industrial system, comprising:
detecting, by a system comprising at least one processor, receipt of a plain language request message from a cloud-based conversation interface system, wherein
the plain language request message is routed by the cloud-based conversation interface system from an instant message application and comprises a request to be notified when one or more conditions of the industrial system specified by the plain language request message become satisfied, and
the one or more conditions comprise at least completion of a production goal by the industrial system;
identifying, by the system, the one or more conditions based on an analysis of the plain language request message;
initiating, by the system in response to the identifying the one or more conditions, a monitoring of a subset of data items indicative of the one or more conditions, wherein the subset of the data items are stored in one or more sources of industrial device data;
in response to a determination, based on the monitoring, that a condition of the one or more conditions has been satisfied:
generating, by the system, a plain language notification message indicating that the condition has been satisfied; and
sending, by the system, the plain language notification message to the instant message application via the cloud-based conversation interface system.

11. The method of claim 10, further comprising establishing, by the system, an identifier for the system based on configuration input, wherein the identifier causes the cloud-based conversation interface system to recognize the system as a member of a chat group defined for the instant message application.

12. The method of claim 10, further comprising:
detecting, by the system, receipt of a plain language query message from the cloud-based conversation interface system, wherein the plain language query message is routed by the cloud-based conversation interface system from the instant message application;
determining, by the system based on another analysis of the plain language query message, at least one of a status of the industrial system or an operational statistic of the industrial system being requested by the plain language query message;
retrieving, by the system based on the determining the at least one of the status or the operational statistic, at least one of the status or the operational statistic from the one or more sources of industrial data; and
generating, by the system, a plain language reply message based on the at least one of the status or the operational statistic retrieved from the one or more sources of industrial data.

13. The method of claim 10, wherein the detecting comprises detecting publication of the plain language request message to a publish-subscribe database.

14. The method of claim 11, further comprising routing, by the cloud-based conversation interface system, the plain language request message to the system based on at least one of the identifier or contextual information contained in the plain language request message.

15. The method of claim 13, wherein the sending comprises publishing the plain language notification message to the publish-subscribe database.

16. The method of claim 12, wherein the retrieving comprises retrieving at least one of the status or the operational statistic from at least one of a data collection device that collects and stores industrial device data generated by a set of industrial devices associated with the industrial system or from at least one industrial device via a plant network.

17. A non-transitory computer-readable medium having stored thereon instructions that, in response to execution, cause a system comprising a processor to perform operations, the operations comprising:
determining that a plain language request message has been received from a cloud-based conversation interface system, wherein
the plain language request message is routed by the cloud-based conversation interface system from an instant message application and comprises a request to be notified when one or more conditions of the industrial system specified by the plain language request message become satisfied, and
the one or more conditions comprise at least completion of a production goal by the industrial system;
analyzing the plain language request message to identify the one or more conditions specified by the plain language query message;
in response to identification of the one or more conditions based on the analyzing, initiating a monitoring of a subset of data items, of a set of data items stored on one or more sources of industrial device data, that are indicative of the one or more conditions;
in response to determining, based on the monitoring, that a condition of the one or more conditions is satisfied:
generating a plain language notification message indicating that the condition is satisfied; and sending the plain language notification message to the instant message application via the cloud-based conversation interface system.

18. The non-transitory computer-readable medium of claim 17, wherein the operations further comprise:
determining that a plain language query message has been received from the cloud-based conversation interface system, wherein the plain language query message is routed by the cloud-based conversation interface system from the instant message application;
analyzing the plain language query message to determine at least one of a status of the industrial system or an operational statistic of the industrial system being requested by the plain language query message;
retrieving, based on the determining, at least one of the status or the operational statistic from one or more of the sources of industrial data associated with the industrial system;
generating a plain language reply message based on the at least one of the status or the operational statistic retrieved from the one or more sources of industrial data; and
sending the plain language reply message to the instant messaging application via the cloud-based conversation interface system.

19. The non-transitory computer-readable medium of claim 18, wherein the retrieving comprises at least one of retrieving at least one of the status or the operational statistic from a data collection device that collects and stores industrial device data generated by a set of industrial devices associated with the industrial system, or retrieving at least one of the status or the operational statistic from one or more industrial devices via a network.

20. The non-transitory computer-readable medium of claim 17, wherein the one or more sources of industrial device data comprise at least one of an industrial device residing on a same network as the system or a data collection device that collects and stores industrial device data generated by a set of industrial devices.

* * * * *